United States Patent
Li

(10) Patent No.: US 11,489,760 B2
(45) Date of Patent: Nov. 1, 2022

(54) MULTICAST GROUP CREATION METHOD, MULTICAST GROUP JOINING METHOD, AND APPARATUS

(71) Applicant: Huawei Technologies Co., Ltd., Shenzhen (CN)

(72) Inventor: Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 17/036,923

(22) Filed: Sep. 29, 2020

(65) Prior Publication Data

US 2021/0014152 A1     Jan. 14, 2021

Related U.S. Application Data

(63) Continuation of application No. PCT/CN2019/080909, filed on Apr. 2, 2019.

(30) Foreign Application Priority Data

Apr. 4, 2018 (CN) .......................... 201810299259.9

(51) Int. Cl.
*H04L 45/16* (2022.01)
*H04L 45/02* (2022.01)

(52) U.S. Cl.
CPC .............. *H04L 45/16* (2013.01); *H04L 45/06* (2013.01); *H04L 45/08* (2013.01)

(58) Field of Classification Search
None
See application file for complete search history.

(56) References Cited

U.S. PATENT DOCUMENTS

| | | | |
|---|---|---|---|
| 10,469,277 B2 | 11/2019 | Hu et al. | |
| 2008/0095183 A1 | 4/2008 | Nijwaard et al. | |
| 2009/0303914 A1 | 12/2009 | Gonsa et al. | |
| 2012/0176953 A1* | 7/2012 | Chao | H04L 65/4076 370/312 |

(Continued)

FOREIGN PATENT DOCUMENTS

| | | |
|---|---|---|
| CN | 101009644 A | 8/2007 |
| CN | 101087300 A | 12/2007 |

(Continued)

*Primary Examiner* — Gregory B Sefcheck
*Assistant Examiner* — Amarnauth G Persaud
(74) *Attorney, Agent, or Firm* — Conley Rose, P.C.

(57) ABSTRACT

A multicast group creation method, a multicast group joining method, and an apparatus, where the multicast group creation method includes: a user multicast source terminal sending a first request message to a first control plane network element to request creation of a multicast group; the first control plane network element sending a second request message to a second control plane network element to request creation of the multicast group; the second control plane network element determining that a next-hop user plane network element of the second user plane network element is a first user plane network element, and then sending information about the first user plane network element to the first control plane network element, which indicates the second user plane network element to send a multicast packet received from the terminal to the first user plane network element.

20 Claims, 9 Drawing Sheets

(56) References Cited

U.S. PATENT DOCUMENTS

| | | | |
|---|---|---|---|
| 2014/0086243 A1* | 3/2014 | Shepherd | H04L 45/16 |
| | | | 370/390 |
| 2015/0236871 A1 | 8/2015 | Kang | |
| 2017/0099156 A1 | 4/2017 | Qiu et al. | |
| 2017/0164161 A1* | 6/2017 | Gupta | H04W 4/06 |
| 2018/0092133 A1 | 3/2018 | Starsinic et al. | |
| 2019/0090298 A1* | 3/2019 | Abraham | H04W 76/27 |
| 2019/0140854 A1* | 5/2019 | Shah | H04L 12/185 |
| 2019/0239032 A1* | 8/2019 | Balasubramanian | |
| | | | H04L 65/1069 |

FOREIGN PATENT DOCUMENTS

| | | |
|---|---|---|
| CN | 101094204 A | 12/2007 |
| CN | 101212394 A | 7/2008 |
| CN | 101529803 A | 9/2009 |
| CN | 103067865 A | 4/2013 |
| CN | 103795636 A | 5/2014 |
| CN | 104518891 A | 4/2015 |
| EP | 1914928 A1 | 4/2008 |
| WO | 2015196361 A1 | 12/2015 |
| WO | 2017197063 A1 | 11/2017 |

* cited by examiner

MULTICAST GROUP CREATION METHOD, MULTICAST GROUP JOINING METHOD, AND APPARATUS

CROSS-REFERENCE TO RELATED APPLICATIONS

This application is a Continuation of International Patent Application No. PCT/CN2019/080909, filed on Apr. 2, 2019, which claims priority to Chinese Patent Application No. 201810299259.9, filed on Apr. 4, 2018, both of which are incorporated herein by reference in their entireties.

TECHNICAL FIELD

This application relates to the field of mobile communications technologies, and in particular, to a multicast group creation method, a multicast group joining method, and an apparatus.

BACKGROUND

Compared with unicast and broadcast, multicast can work more efficiently in point-to-multipoint transmission and distribution. In a multicast mode, data can be sent to a group of users along a specific path, and there is at most one copy of same multicast data on each link. Compared with the unicast, when the multicast mode is used for information transfer, an increase of users does not significantly increase network load. Therefore, load on a server and device is reduced. Compared with the broadcast, multicast data is sent only to a multicast user. This reduces redundant traffic and network load, and saves network bandwidth.

Currently, in a 5th generation (5G) mobile local area network (MLAN), a proposed functional requirement is that the user serves as a multicast source. To be specific, the user can serve as the multicast source (in this case, the multicast source may be referred to as a user multicast source) and send a user multicast packet, and another user can join a multicast group and receive the user multicast packet.

For the foregoing application scenario, how to create the multicast group is a problem to be resolved.

SUMMARY

This application provides a multicast group creation method, a multicast group joining method, and an apparatus, to create a multicast group when a user serves as a multicast source.

According to a first aspect, this application provides a multicast group creation method, including: A first control plane network element receives a first request message from a terminal, where the first request message is used to request to create a multicast group; the first control plane network element sends a second request message to a second control plane network element, where the second request message is used to request to create the multicast group; the first control plane network element receives information about a first user plane network element from the second control plane network element; and the first control plane network element sends indication information to a second user plane network element, where the indication information is used to indicate the second user plane network element to send a multicast packet received from the terminal to the first user plane network element.

In the foregoing method, the terminal serves as a user multicast source and sends the first request message to the first control plane network element to request creation of the multicast group. After receiving the first request message, the first control plane network element sends the second request message to the second control plane network element to request creation of the multicast group. After receiving the second request message, the second control plane network element determines that a next-hop user plane network element of the second user plane network element is the first user plane network element, and then sends the information about the first user plane network element to the first control plane network element. Then, the first control plane network element indicates the second user plane network element to send the multicast packet received from the terminal to the first user plane network element. According to the method, a path for sending the multicast packet sent by the terminal is created. In other words, the terminal serves as the user multicast source, and sends the multicast packet to the second user plane network element. Then, the second user plane network element sends the multicast packet to the first user plane network element. The first user plane network element may be a multicast source or an intermediate user plane network element between the second user plane network element and the multicast source.

In a possible implementation, the information about the first user plane network element includes at least one of identification information of the first user plane network element, address information of the first user plane network element, or a tunnel identifier.

The tunnel identifier is an identifier of a tunnel between the second user plane network element and the first user plane network element.

In a possible implementation, the first request message includes a multicast group address, the second request message includes the multicast group address, and the indication information includes the multicast group address.

In still another possible implementation, the first control plane network element allocates a multicast group address, the second request message includes the multicast group address, and the indication information includes the multicast group address.

In still another possible implementation, the first control plane network element receives a multicast group address allocated by the second control plane network element, and the indication information includes the multicast group address.

In a possible implementation, the first control plane network element sends the multicast group address to the terminal.

In a possible implementation, if the first request message includes a multicast group identifier, the following may be further included: The first control plane network element determines a correspondence between the multicast group identifier and the multicast group address, and sends the correspondence to a network function network element.

In a possible implementation, the following may be further included: The first control plane network element receives address information of a third user plane network element sent by the second control plane network element, where the address information is used as a multicast source address when the third user plane network element serves as a multicast source of the multicast group; and the first control plane network element determines a correspondence between the address information of the third user plane network element and the multicast group address, and sends the correspondence to a network function network element.

According to the method, the second control plane network element determines the third user plane network element as the multicast source, and sends the address information of the third user plane network element to the first control plane network element, where the address information may be used as the multicast source address. The third user plane network element and the first user plane network element may be a same user plane network element, or may be two different user plane network elements.

According to a second aspect, this application provides a multicast group creation method, including: A first control plane network element receives a first request message from a terminal, where the first request message is used to request to create a multicast group; and the first control plane network element sends first indication information to a second user plane network element, where the first indication information is used to indicate the second user plane network element to receive a multicast packet sent by the terminal.

According to the method, the terminal serves as a user multicast source and sends the first request message to the first control plane network element to request creation of the multicast group. After receiving the first request message, the first control plane network element sends the first indication information to the second user plane network element, to indicate the second user plane network element to receive the multicast packet sent by the terminal. According to the method, the multicast packet of the terminal is sent to the second user plane network element, and the second user plane network element continues to send the multicast packet.

In a possible implementation, the following may be further included: The first control plane network element sends a second request message to a second control plane network element, where the second request message is used to request to create the multicast group; and the first control plane network element receives second indication information from the second control plane network element, where the second indication information is used to notify that the second user plane network element is to serve as a multicast source.

According to the method, the second control plane network element indicates that the second user plane network element is to serve as the multicast source and is configured to send the multicast packet from the terminal.

In a possible implementation, the first request message includes a multicast group address, the second request message includes the multicast group address, and the first indication information includes the multicast group address.

In still another possible implementation, the first control plane network element allocates a multicast group address, the second request message includes the multicast group address, and the first indication information includes the multicast group address.

In still another possible implementation, the first control plane network element receives a multicast group address allocated by the second control plane network element, and the first indication information includes the multicast group address.

In a possible implementation, the following is further included: The first control plane network element sends the multicast group address to the terminal.

In a possible implementation, the following is further included: The first control plane network element determines a correspondence between a multicast group identifier and the multicast group address, and sends the correspondence to a network function network element.

In a possible implementation, the following is further included: The first control plane network element determines a correspondence between address information of the second user plane network element and the multicast group address, and sends the correspondence to a network function network element, where the address information is used as a multicast source address when the second user plane network element serves as the multicast source of the multicast group.

In a possible implementation, the following is further included: The first control plane network element sends third indication information to the second user plane network element, where the third indication information is used to indicate the second user plane network element to use the address information of the second user plane network element as a source address of the multicast packet when sending the multicast packet identified by a multicast address.

In a possible implementation, the following is further included: The first control plane network element sends the address information of the second user plane network element to the second user plane network element.

According to a third aspect, this application provides a multicast group creation method, including: A second control plane network element receives a request message sent by a first control plane network element, where the request message is used to request to create a multicast group; and the second control plane network element sends information about a first user plane network element to the first control plane network element.

In a possible implementation, the information about the first user plane network element includes at least one of an identifier, an address, or a tunnel identifier of the first user plane network element.

In a possible implementation, the following is further included: The second control plane network element selects a third user plane network element as a multicast source.

In a possible implementation, the following is further included: The second control plane network element sends address information of the third user plane network element to the first control plane network element, where the address information is used as a multicast source address when the third user plane network element serves as the multicast source of the multicast group.

In a possible implementation, the following is further included: The second control plane network element sends third indication information to the third user plane network element, where the indication information is used to indicate the third user plane network element to use the address information of the third user plane network element as a source address of the multicast packet when sending the multicast packet identified by a multicast address.

In a possible implementation, the following is further included: The second control plane network element sends the address information of the third user plane network element to the third user plane network element.

According to a fourth aspect, this application provides a multicast group creation method, including: A second control plane network element receives a request message from a first control plane network element, where the request message is used to request to create a multicast group; and the second control plane network element sends indication information to the first control plane network element, where the indication information is used to indicate to use a second user plane network element as a multicast source.

According to the method, after receiving the request message used to request to create the multicast group, the second control plane network element selects the second user plane network element as the multicast source and notifies the first control plane network element.

According to a fifth aspect, this application provides a multicast group creation method, including: A terminal sends a request message to a first control plane network element, where the request message is used to request to create a multicast group; and the terminal receives a response message from the first control plane network element, where the response message is used to indicate completion of creating the multicast group.

According to the method, the terminal serves as a user multicast source and sends, to the first control plane network element, the request message used to request to create the multicast group. Then, the terminal receives the response message used to indicate completion of creating the multicast group. In this way, a procedure that is for creating the multicast group and that is initiated by the terminal is completed.

In a possible implementation, the request message includes information about the multicast group, and the information about the multicast group includes identification information of the multicast group.

In still another possible implementation, the identification information of the multicast group includes a multicast group identifier or a multicast group address.

In still another possible implementation, the response message includes the multicast group address.

According to a sixth aspect, this application provides a multicast group joining method, including: A third control plane network element receives a multicast group join request from a fourth user plane network element, where the multicast group join request includes information about a multicast group; the third control plane network element determines that the fourth user plane network element has not joined the multicast group; and the third control plane network element sends a request message to a second control plane network element, where the request message includes information about the fourth user plane network element and the information about the multicast group, and the request message is used to request to add the fourth user plane network element to the multicast group.

According to the method, the fourth user plane network element is added to the multicast group, and a multicast source can subsequently send a multicast packet to the fourth user plane network element.

In a possible implementation, the following is further included: the third control plane network element sends first indication information to the fourth user plane network element, where the first indication information is used to indicate the fourth user plane network element to send a received multicast packet to a terminal.

In a possible implementation, the following is further included: The third control plane network element receives information about a fifth user plane network element from the second control plane network element; and the third control plane network element sends second indication information to the fourth user plane network element, where the second indication information is used to indicate the fourth user plane network element to send a multicast join packet to the fifth user plane network element.

According to a seventh aspect, this application provides a multicast group joining method, including: A second control plane network element receives a request message from a third control plane network element, where the request message includes information about a fourth user plane network element and information about a multicast group, and the request message is used to request to add the fourth user plane network element to the multicast group; and the second control plane network element determines that a fifth user plane network element is a multicast source node of the fourth user plane network element.

According to the method, the multicast source node is selected for the fourth user plane network element, and the fourth user plane network element may receive a multicast packet from the fifth user plane network element.

In a possible implementation, the following is further included: The second control plane network element sends information about the fifth user plane network element to the third control plane network element.

In a possible implementation, the following is further included: The second control plane network element sends indication information to the fourth control plane network element, where the indication information includes the information about the multicast group, the information about the fourth user plane network element, and the information about the fifth user plane network element, and the indication information is used to indicate to add the fourth user plane network element to the multicast group to which the fifth user plane network element belongs.

According to an eighth aspect, this application provides an apparatus. The apparatus may be a control plane network element, or may be a chip. The apparatus has a function of implementing the embodiments of the first aspect or the second aspect. The function may be implemented by hardware, or by hardware executing corresponding software. The hardware or the software includes one or more modules corresponding to the function.

According to a ninth aspect, this application provides an apparatus, including a processor and a memory. The memory is configured to store a computer-executable instruction. When the apparatus is run, the processor executes the computer-executable instruction stored in the memory, such that the apparatus performs the multicast group creation method described in either the first aspect or the second aspect.

According to a tenth aspect, this application provides an apparatus. The apparatus may be a control plane network element, or may be a chip. The apparatus has a function of implementing the embodiments of the third aspect or the fourth aspect. The function may be implemented by hardware, or by hardware executing corresponding software. The hardware or the software includes one or more modules corresponding to the function.

According to an eleventh aspect, this application provides an apparatus, including a processor and a memory. The memory is configured to store a computer-executable instruction. When the apparatus is run, the processor executes the computer-executable instruction stored in the memory, such that the apparatus performs the multicast group creation method described in either the third aspect or the fourth aspect.

According to a twelfth aspect, this application provides an apparatus. The apparatus may be a terminal, or may be a chip. The apparatus has a function of implementing the embodiments of the fifth aspect. The function may be implemented by hardware, or by hardware executing corresponding software. The hardware or the software includes one or more modules corresponding to the function.

According to a thirteenth aspect, this application provides an apparatus, including a processor and a memory. The memory is configured to store a computer-executable instruction. When the apparatus is run, the processor executes the computer-executable instruction stored in the memory, such that the apparatus performs the multicast group creation method described in the fifth aspect.

According to a fourteenth aspect, this application provides an apparatus. The apparatus may be a control plane network element, or may be a chip. The apparatus has a function of implementing the embodiments of the sixth aspect. The function may be implemented by hardware, or by hardware executing corresponding software. The hardware or the software includes one or more modules corresponding to the function.

According to a fifteenth aspect, this application provides an apparatus, including a processor and a memory. The memory is configured to store a computer-executable instruction. When the apparatus is run, the processor executes the computer-executable instruction stored in the memory, such that the apparatus performs the multicast group joining method described in the sixth aspect.

According to a sixteenth aspect, this application provides an apparatus. The apparatus may be a control plane network element, or may be a chip. The apparatus has a function of implementing the embodiments of the seventh aspect. The function may be implemented by hardware, or by hardware executing corresponding software. The hardware or the software includes one or more modules corresponding to the function.

According to a seventeenth aspect, this application provides an apparatus, including a processor and a memory. The memory is configured to store a computer-executable instruction. When the apparatus is run, the processor executes the computer-executable instruction stored in the memory, such that the apparatus performs the multicast group joining method described in the seventh aspect.

According to an eighteenth aspect, this application further provides a computer-readable storage medium, where the computer-readable storage medium stores an instruction, and when the instruction is run on a computer, the computer is enabled to perform the methods in the foregoing aspects.

According to a nineteenth aspect, this application further provides a computer program product that includes an instruction. When the computer program product runs on a computer, the computer is enabled to perform the methods in the foregoing aspects.

According to a twentieth aspect, this application further provides a system. The system includes the first control plane network element and the second control plane network element in any one of the foregoing method embodiments. Further, the system may include the third control plane network element in the foregoing method embodiment.

These aspects or other aspects in this application may be clearer and more intelligible in descriptions in the following embodiments.

DESCRIPTION OF EMBODIMENTS

The following further describes in detail this application with reference to the accompanying drawings. A specific operation method in method embodiments in this application may also be applied to an apparatus embodiment or a system embodiment. In the descriptions of this application, unless otherwise stated, "a plurality" means two or more.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
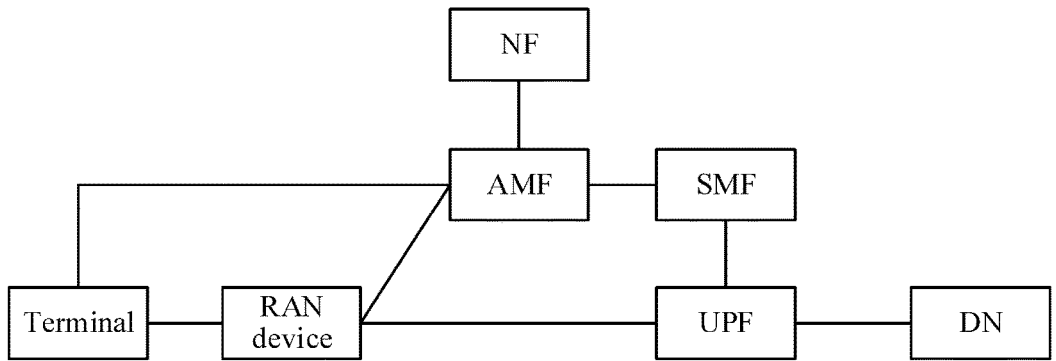
FIG. 1 is a schematic diagram of a possible network architecture according to this application.

FIG. 1 is a schematic diagram of a possible network architecture to which this application is applicable. The network architecture includes a session management function (SMF) network element and a user plane function (UPF) network element. Further, the network architecture may include a terminal, a radio access network (RAN) device, and an access and mobility management function (AMF) network element. Further, the network architecture includes a data network (DN).

The UPF network element is mainly responsible for processing a user packet, such as forwarding and charging. In this application, the UPF network element is responsible for forwarding a multicast packet.

The SMF network element is mainly responsible for session management in a mobile network, such as session establishment, modification, and release. For example, the SMF network element is responsible for, for example, allocating an Internet Protocol (IP) address to a user, or selecting a user plane network element that provides a packet forwarding function.

The AMF network element is responsible for access management and mobility management of an access device. In addition to a mobility management function of a mobility management entity (MME) in a network framework in Long-Term Evolution (LTE), the AMF network element further includes an access management function.

The DN is mainly used for providing application data for the user.

The terminal, for example, may include various handheld devices, vehicle-mounted devices, wearable devices, computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a vehicle, a terminal device, or the like.

The RAN device includes but is not limited to: a g nodeB (gNB) in 5G, an evolved Node B (eNB), a radio network controller (RNC), a NodeB (NB), a base station controller (BSC), a base transceiver station (BTS), a home base station (for example, a home evolved nodeB HNB)), a baseband unit (BBU), a transmission reception point (e.g., transmitting and receiving point (TRP)), a transmitting point (TP), a mobile switching center, or the like. The RAN device may further include a Wi-Fi access point (AP) or the like.

Further, the network architecture shown in FIG. 1 may further include a broadcast multicast service center (BM-SC) user plane (BM-SC UP) and a broadcast multicast service center (BM-SC) control plane (BM-SC CP). The BM-SC UP may be disposed in the DN, or disposed in a UPF network element, or disposed between the UPF network element and the DN. The BM-SC CP may be disposed in the SMF network element, or may be an independent control plane network element.

Further, the network architecture may include one or more network function (NF) network elements. As shown in FIG. 1, the NF network element may be separately disposed as a function network element connected to the AMF. Alternatively, the NF network element is disposed in the SMF network element and is used as a component of the SMF network element.

It may be understood that the foregoing functions may be network elements in a hardware device, or may be software functions running on dedicated hardware, or may be virtual functions instantiated on a platform (for example, a cloud platform).

For ease of description, the AMF network element, the SMF network element, the UPF network element, and the NF network element are briefly referred to as an AMF, an SMF, a UPF, and an NF respectively below in this application.

Figure 2:
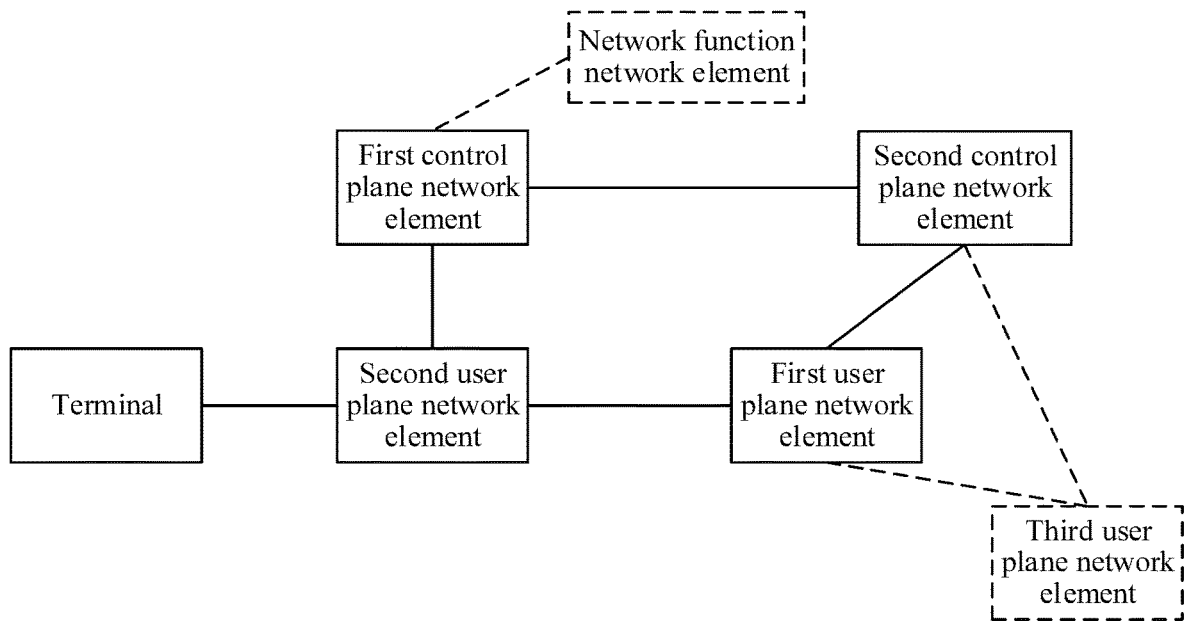
FIG. 2 is an application scenario to which this application is applicable and that is based on a system architecture shown in FIG. 1.

FIG. 2 is an application scenario to which this application is applicable and that is based on the system architecture shown in FIG. 1. A user plane network element serving a terminal is a second user plane network element, a control plane network element serving the terminal is a first control plane network element, and the first control plane network element manages the second user plane network element.

Further, a second control plane network element is connected to the first control plane network element, the second control plane network element manages a first user plane network element, and the first user plane network element is connected to the second user plane network element. Optionally, the second control plane network element further manages a third user plane network element. It should be noted that in this application, the third user plane network element and the first user plane network element may be a same user plane network element in some scenarios but different user plane network elements in other scenarios.

Figure 3:
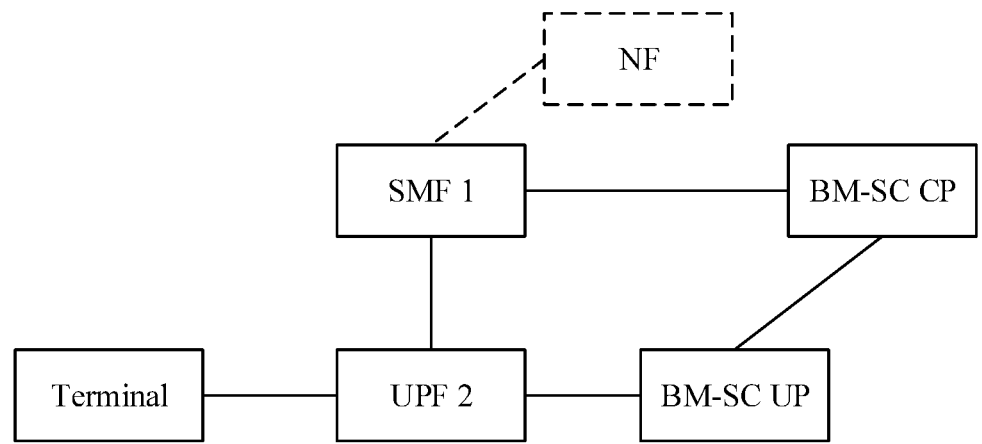
FIG. 3 is an example based on an application scenario shown in FIG. 2.

FIG. 3 is an example based on the application scenario shown in FIG. 2. The first control plane network element shown in FIG. 2 is an SMF, which, for example, is referred to as an SMF 1. The second control plane network element is a BM-SC CP. The second user plane network element is a UPF, which, for example, is referred to as a UPF 2. The first user plane network element is a BM-SC UP. The third user plane network element is not included in FIG. 3.

Figure 4:
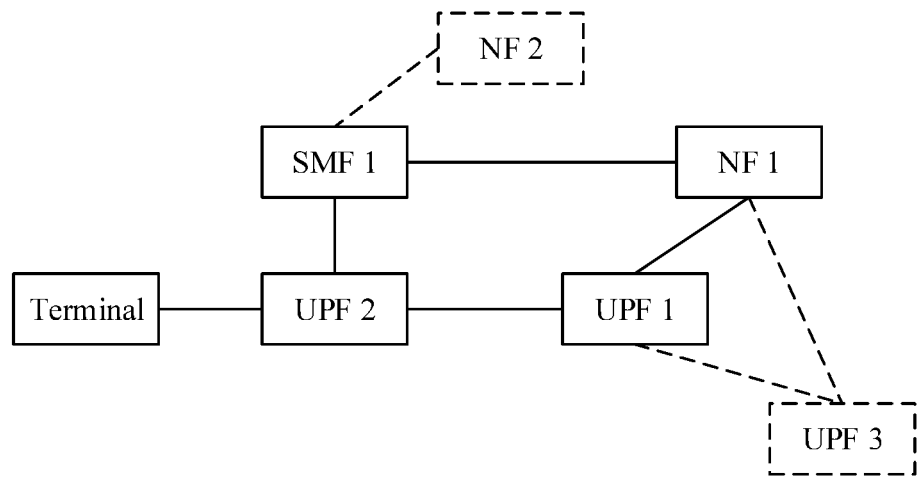
FIG. 4 is another example based on an application scenario shown in FIG. 2.

FIG. 4 is another example based on the application scenario shown in FIG. 2. The first control plane network element shown in FIG. 2 is an SMF, which, for example, is referred to as an SMF 1. The second control plane network element is an NF, which, for example, is referred to as an NF 1. The second user plane network element is a UPF, which, for example, is referred to as a UPF 2. The first user plane network element is a UPF, which, for example, is referred to as a UPF 1. Optionally, the third user plane network element is further included, and is referred to as, for example, a UPF 3. Optionally, an NF 2 is further included, and the NF 2 is connected to the SMF 1.

With reference to FIG. 2 to FIG. 4, the following describes a multicast group creation method provided in this application. For example, when needing to be used as a user multicast source to send a multicast packet, the terminal shown in FIG. 2 may first request creation of a multicast group. After the multicast group is created, the terminal may serve as the user multicast source to send the multicast packet. The following describes a multicast group creation method.

Figure 5:
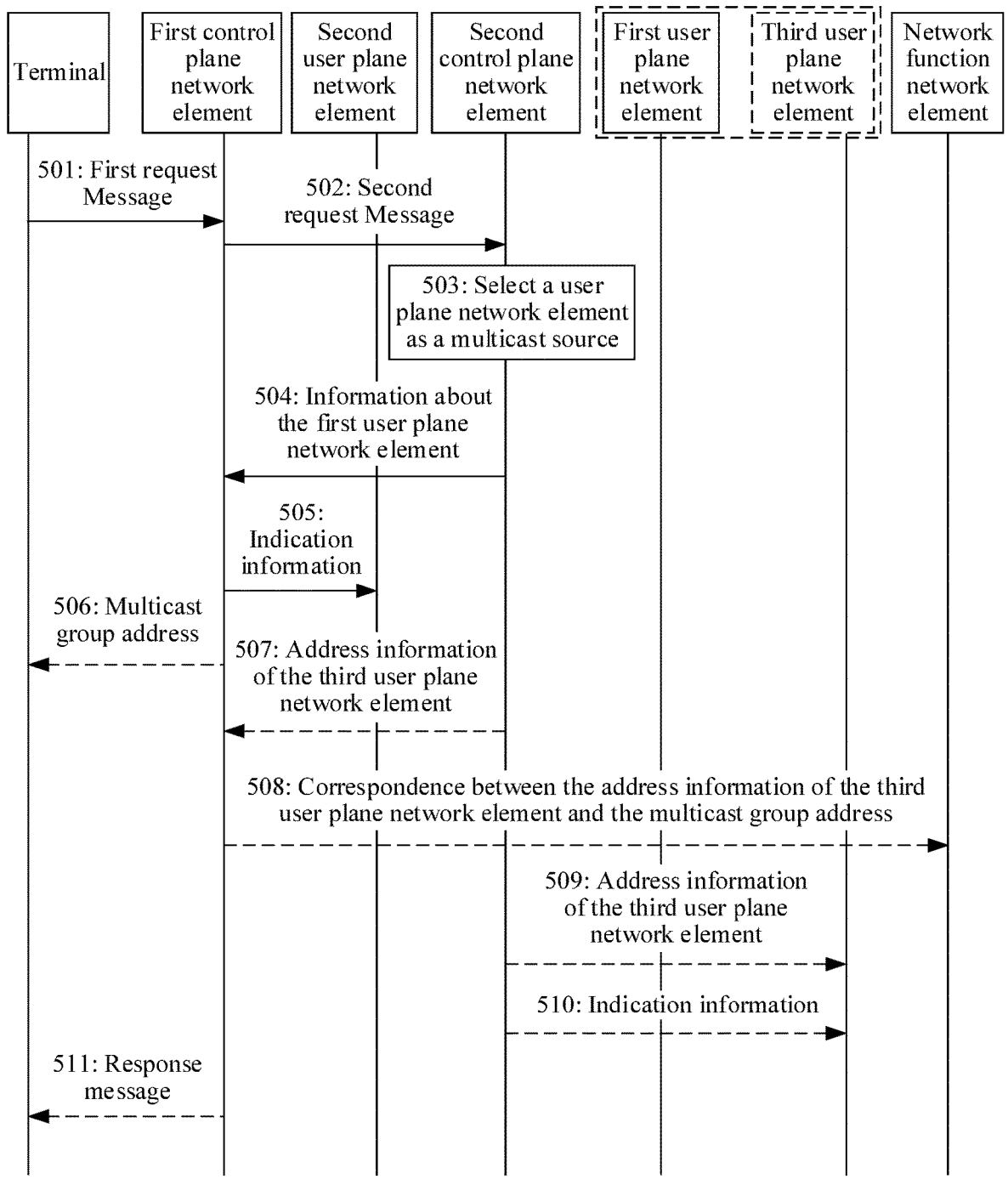
FIG. 5 is a schematic flowchart of a multicast group creation method according to an embodiment of this application.

FIG. 5 shows a multicast group creation method provided in an embodiment of this application. The method includes the following steps.

Step 501: A terminal sends a first request message to a first control plane network element, and correspondingly, the first control plane network element receives the first request message.

The first request message is used to request to create a multicast group.

Step 502: The first control plane network element sends a second request message to a second control plane network element, and correspondingly, the second control plane network element receives the second request message.

The second request message is used to request to create the multicast group.

To be more specific, after receiving the first request message from the terminal, the first control plane network element sends the second request message to the second control plane network element to request the second control plane network element to create the multicast group.

Step 503: The second control plane network element selects a user plane network element as a multicast source.

After receiving the request from the first control plane network element, the second control plane network element selects a user plane network element and uses the user plane network element as the multicast source. The multicast source is configured to receive a multicast packet sent by the terminal, and then send the received multicast packet to another terminal in the multicast group.

It may also be understood that in this application, when the terminal serves as a user multicast source and sends the multicast packet, a network-side multicast source may be created for the terminal. Then, when the terminal needs to send the multicast packet, the terminal sends the multicast packet to the network-side multicast source, and the multicast source continues to send the multicast packet to the other terminal in the multicast group. Therefore, the multicast packet of the terminal is sent to the other terminal in the multicast group.

The second control plane network element selects different user plane network elements as multicast sources in different application scenarios.

For example, based on the application scenario shown in FIG. 3, when the second control plane network element is the BM-SC CP, a user plane network element selected by the second control plane network element as the multicast source is the BM-SC UP. In this scenario, the selected multicast source is referred to as a third user plane network element. Therefore, the third user plane network element in this scenario is the BM-SC UP.

For another example, based on the application scenario shown in FIG. 4, when the second control plane network element is the NF 1, a user plane network element selected by the second control plane network element as the multicast source is a UPF. For example, the second control plane network element may select the UPF 1 as the multicast source, or select the UPF 3 as the multicast source. In this scenario, the selected multicast source is referred to as a third user plane network element. Therefore, when the selected user plane network element serving as the multicast source is the UPF 1, the third user plane network element is a first user plane network element (namely, the UPF 1). When the selected user plane network element serving as the multicast source is the UPF 3, the third user plane network element (namely, the UPF 3) and the first user plane network element (namely, the UPF 1) are different user plane network elements.

Step 504: The second control plane network element sends information about the first user plane network element to the first control plane network element, and correspondingly, the first control plane network element receives the information about the first user plane network element.

The first user plane network element is a user plane network element connected to a second user plane network element, and the first user plane network element is also referred to as a next-hop user plane network element of the second user plane network element.

For example, based on the application scenario shown in FIG. 3, the second control plane network element (namely, the BM-SC CP) selects the BM-SC UP as the multicast source. In this case, information about the first user plane network element sent by the BM-SC CP to the second user plane network element (namely, the UPF 2) is information about the BM-SC UP.

For another example, based on the application scenario shown in FIG. 4, the second control plane network element (namely, the NF 1) selects the UPF 1 as the multicast source. In this case, information about the first user plane network element sent by the NF 1 to the second user plane network element (namely, the UPF 2) is information about the UPF 1. For still another example, based on the application scenario shown in FIG. 4, the second control plane network element (namely, the NF 1) selects the UPF 3 as the multicast source. In this case, information about the first user plane network element sent by the NF 1 to the second user plane network element (namely, the UPF 2) is still information about the UPF 1. Therefore, based on the application scenario shown in FIG. 4, the NF 1 always sends information about a next-hop user plane network element of the UPF 2 to the UPF 2, and the next-hop user plane network element may be a selected multicast source or may not be a selected multicast source.

In an implementation in step 504, the information about the first user plane network element sent by the second control plane network element may be at least one of identification information of the first user plane network element, address information of the first user plane network element, or a tunnel identifier. The tunnel identifier is an identifier of a tunnel between the second user plane network element and the first user plane network element. Alternatively, it is understood that the tunnel identifier is used to identify a tunnel between the second user plane network element and the first user plane network element.

Step 505: The first control plane network element sends indication information to the second user plane network element, and correspondingly, the second user plane network element receives the indication information.

The indication information is used to indicate the second user plane network element to send the multicast packet received from the terminal to the first user plane network element.

After receiving the information about the first user plane network element, the first control plane network element further sends the indication information to the second user plane network element, to indicate the second user plane network element to send, after subsequently receiving the multicast packet sent by the terminal, the multicast packet to the first user plane network element. When the first user plane network element is not the multicast source, the first user plane network element further needs to send the received multicast packet to the multicast source.

According to the foregoing method, when the terminal requests creation of the multicast group, the first control plane network element allocates the network-side multicast source for the terminal via the second control plane network element. For example, the network-side multicast source is the BM-SC UP in FIG. 3, or the UPF 1 or the UPF 3 in FIG. 4. In this way, when the terminal serves as the user multicast source and sends the multicast packet, a user plane network element, namely, the second user plane network element, corresponding to the terminal may send the multicast packet received from the terminal to the first user plane network element. If the first user plane network element is the selected multicast source, the multicast source may send the multicast packet to another terminal in the multicast group. Alternatively, when the first user plane network element is not the multicast source, the first user plane network element may send the received multicast packet to the multicast source, and then the multicast source sends the multicast packet to another terminal in the multicast group. Therefore, the multicast group is created for the terminal serving as a multicast source.

Further, in an implementation, a multicast group address or a multicast group identifier may be used in this application to identify a multicast group.

For example, before sending the first request message to the first control plane network element, the terminal may obtain a multicast group address of a multicast group that needs to be created. In this case, the first request message in step 501 may carry the multicast group address. Correspondingly, the first control plane network element may obtain the multicast group address from the first request message, and send the second request message including the multicast group address to the second control plane network element in step 502. Further, the first control plane network element may include the multicast group address in the indication information in step 505, such that the second user plane network element may obtain the multicast group address.

For another example, before sending the first request message to the first control plane network element, the terminal cannot obtain a multicast group address of a multicast group that needs to be created. In this case, the first request message in step 501 does not carry the multicast group address. In this case, in an implementation, the first control plane network element may allocate the multicast group address, and send the second request message including the allocated multicast group address to the second control plane network element in step 502. Further, the first control plane network element may include the multicast group address in the indication information in step 505, such that the second user plane network element may obtain the multicast group address. In addition, the first control plane network element may further send the multicast group address to the terminal in the following step 506.

For still another example, before sending the first request message to the first control plane network element, the terminal cannot obtain a multicast group address of a multicast group that needs to be created. In this case, the first request message in step 501 does not carry the multicast group address. In this case, in another implementation, the second control plane network element may allocate the multicast group address, and send the allocated multicast group address to the first control plane network element in step 504, or send the allocated multicast group address to the first control plane network element in a separate step. Further, the first control plane network element may include the multicast group address in the indication information in step 505, such that the second user plane network element may obtain the multicast group address. In addition, the first control plane network element may further send the multicast group address to the terminal in the foregoing step 506.

Further, when the multicast group address is allocated by the first control plane network element or the second control plane network element, the first request message does not carry the multicast group address. In this case, in an implementation, the terminal may send the first request message including the multicast group identifier to the first control plane network element. Subsequently, after the first control plane network element allocates the multicast group address or the first control plane network element receives the multicast group address from the second control plane network element, the first control plane network element may further determine a correspondence between the multicast group identifier and the multicast group address. Then, the first control plane network element sends the correspondence to a network function network element for storage. In this way, the corresponding multicast group address can be subsequently obtained from the network function network element through query based on the multicast group identifier. For example, based on the application scenario shown in FIG. 3, the SMF 1 may establish the correspondence between the multicast group identifier and the multicast group address, and then send the correspondence to the NF for storage. For another example, based on the application scenario shown in FIG. 4, the SMF 1 may establish the correspondence between the multicast group identifier and the multicast group address and then send the correspondence to the NF 2 for storage.

The multicast group identifier and the multicast group address may be collectively referred to as identification information of the multicast group. In other words, the identification information of the multicast group includes the multicast group identifier and/or the multicast group address. Certainly, the identification information of the multicast group may further include other identification information. Further, the identification information of the multicast group may be one type of information about the multicast group. In other words, the information about the multicast group includes the identification information of the multicast group.

Optionally, in an implementation, after the second control plane network element selects the third user plane network element as the multicast source, the following steps 507 and 508 may be further included.

Step 506: The first control plane network element sends the multicast group address to the terminal, and correspondingly, the terminal receives the multicast group address.

Step 506 is optional. In addition, there is no strict execution sequence between steps 506 and 505.

Step 507: The second control plane network element sends address information of the third user plane network element to the first control plane network element, and correspondingly, the first control plane network element receives the address information of the third user plane network element.

It should be noted that, if the multicast source selected by the second control plane network element is the first user plane network element, the third user plane network element herein is the first user plane network element; or if the multicast source selected by the second control plane network element is not the first user plane network element, the third user plane network element herein is different from the first user plane network element.

Step 508: The first control plane network element determines a correspondence between the address information of the third user plane network element and the multicast group address, and sends the correspondence to the network function network element.

For example, based on the application scenario shown in FIG. 3, the SMF 1 may establish the correspondence between the address information of the third user plane network element and the multicast group address, and then send the correspondence to the NF for storage. For another example, based on the application scenario shown in FIG. 4, the SMF 1 may establish the correspondence between the address information of the third user plane network element and the multicast group address, and then send the correspondence to the NF 2 for storage.

A function of the address information of the third user plane network element (namely, the multicast source) is as follows: After the multicast group is created, the terminal sends the multicast packet to the third user plane network element via the second user plane network element, where the multicast packet includes a source address and a destination address, and the source address is an address of the terminal. After receiving the multicast packet, the third user plane network element may replace the source address in the multicast packet with the address information of the third user plane network element, and then send the multicast packet to another terminal. In this way, the source address of the terminal serving as the user multicast source may be invisible, and the other terminal that receives the multicast packet considers that the third user plane network element is the multicast source.

It should be noted that steps 507 and 508 may be performed in any step after step 503. Alternatively, steps 507 and 504 may be combined into one step for execution.

Further, in an implementation, the following steps 509 and 510 may be included.

Step 509: The second control plane network element sends the address information of the third user plane network element to the third user plane network element, and correspondingly, the third user plane network element receives the address information of the third user plane network element.

Step 510: The second control plane network element sends indication information to the third user plane network element, and correspondingly, the third user plane network element receives the indication information.

The indication information is used to indicate the third user plane network element to use the address information of the third user plane network element as the source address of the multicast packet when sending the multicast packet identified by a multicast address.

It should be noted that steps 509 and 510 may also be combined into one step for execution. Further, steps 509 and 510 may be performed in any step after step 503.

Optionally, the following step 511 may be further included.

Step 511: The first control plane network element sends a response message to the terminal, and correspondingly, the terminal receives the response message.

If step 511 is performed, in an implementation, steps 511 and 506 may be separately performed and step 511 may be performed in any step after step 504. In another implementation, steps 511 and 506 may be combined into one step for execution. In this case, the response message in step 511 includes the multicast group address and step 511 may still be performed in any step after step 504.

According to the foregoing method steps, the terminal initiates a request for creating the multicast group, and then the second control plane network element selects a user plane network element as the multicast source. The multicast source selected in this application is referred to as the third user plane network element, and the third user plane network element may be the BM-SC UP or the UPF. When the third user plane network element is the first user plane network element, the terminal may send the multicast packet to the second user plane network element, and the second user plane network element sends the multicast packet to the first user plane network element. Subsequently, the first user plane network element serves as the multicast source and sends the multicast packet to another terminal in the multicast group. When the third user plane network element and the first user plane network element are different user plane network elements, the terminal may send the multicast packet to the second user plane network element, and the second user plane network element sends the multicast packet to the first user plane network element. Then, the first user plane network element sends the multicast packet to the third user plane network element. Subsequently, the third user plane network element serves as the multicast source and sends the multicast packet to another terminal in the multicast group. Therefore, the multicast group is created.

Figure 6:
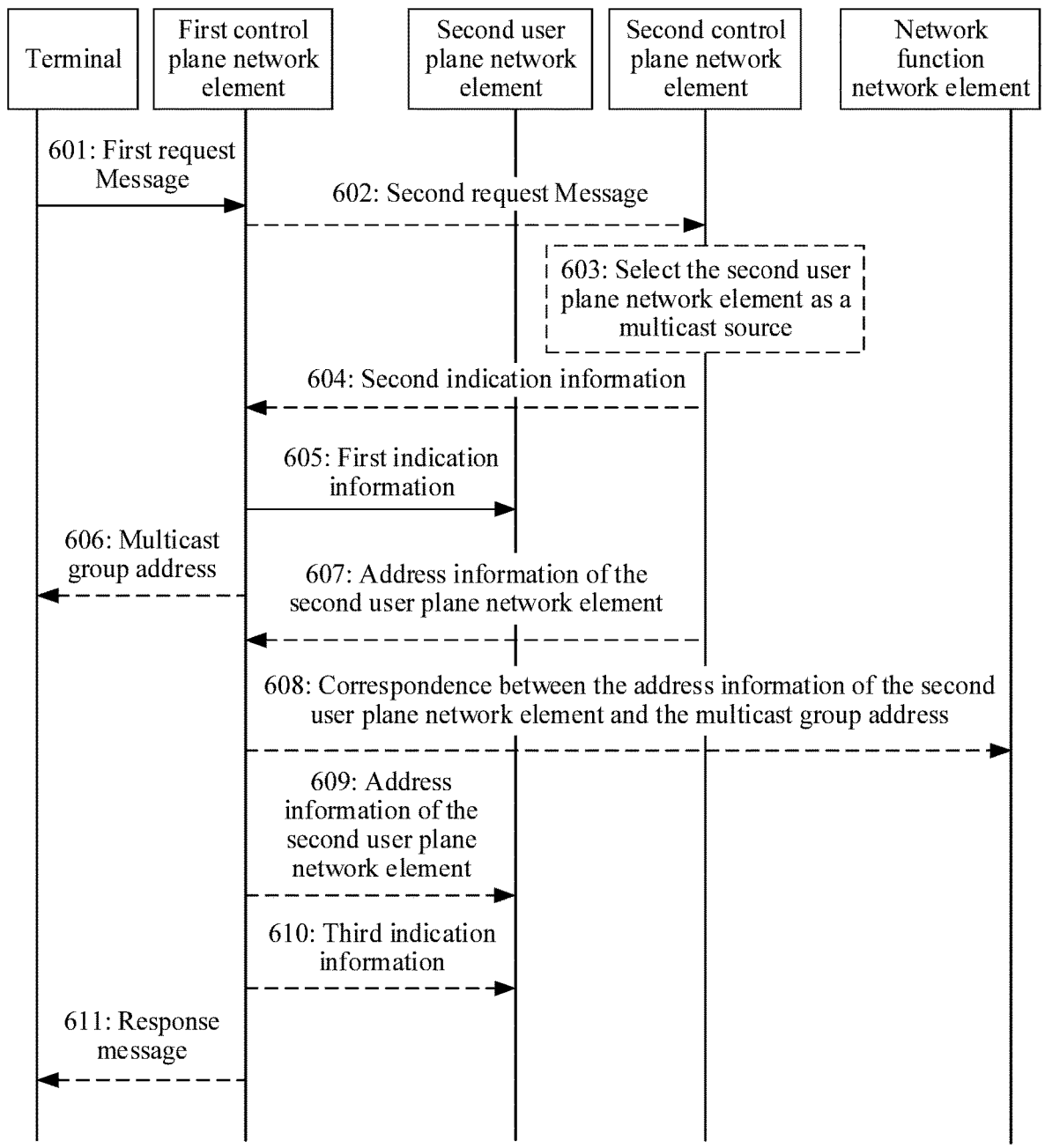
FIG. 6 is a flowchart of another multicast group creation method according to an embodiment of this application.

The following describes another multicast group creation method. FIG. 6 shows another multicast group creation method provided in an embodiment of this application. The method includes the following steps.

Step 601: A terminal sends a first request message to a first control plane network element, and correspondingly, the first control plane network element receives the first request message.

The first request message is used to request to create a multicast group.

Optionally, the following steps 602 to 604 may be further included.

Step 602: The first control plane network element sends a second request message to a second control plane network element, and correspondingly, the second control plane network element receives the second request message.

The second request message is used to request to create the multicast group.

To be more specific, after receiving the first request message from the terminal, the first control plane network element sends the second request message to the second control plane network element to request the second control plane network element to create the multicast group.

Step 603: The second control plane network element selects a second user plane network element as a multicast source.

After receiving the request from the first control plane network element, the second control plane network element uses the second user plane network element as the multicast source. The multicast source is configured to receive a multicast packet sent by the terminal, and then send the received multicast packet to another terminal in the multicast group.

It may also be understood that in this application, when the terminal serves as a user multicast source and sends the multicast packet, a network-side multicast source may be created for the terminal. Then, when the terminal needs to send the multicast packet, the terminal directly sends the multicast packet to the network-side multicast source, and the multicast source continues to send the multicast packet to the other terminal in the multicast group. Therefore, the multicast packet of the terminal is sent to the other terminal in the multicast group.

Step 604: The second control plane network element sends second indication information to the first control plane network element, and correspondingly, the first control plane network element receives the second indication information.

To be more specific, the second control plane network element notifies, through the second indication information, the first control plane network element to select the second user plane network element as the multicast source. In addition, the second user plane network element is a user plane network element serving the terminal.

Step 605: The first control plane network element sends first indication information to the second user plane network element, and correspondingly, the second user plane network element receives the first indication information.

The first indication information is used to indicate the second user plane network element to receive the multicast packet sent by the terminal. Alternatively, the first indication information may be further used to indicate that the second user plane network element is to serve as the multicast source.

Therefore, when subsequently receiving the multicast packet sent by the terminal, the second user plane network element serves as the multicast source and sends the received multicast packet to the other terminal in the multicast group.

It should be noted that, steps 602 to 604 are optional. If steps 602 to 604 are not performed, after receiving the first request message, the first control plane network element may directly determine, in a preset manner, the second user plane network element as the multicast source. Therefore, step 605 is performed after step 601.

According to the foregoing method, when the terminal requests creation of the multicast group, the first control plane network element may allocate a network-side multicast source, namely, the second user plane network element, for the terminal via the second control plane network element. Alternatively, the first control plane network element directly determines the second user plane network element as the multicast source. In this way, when the terminal serves as the user multicast source and sends the multicast packet, the user plane network element, namely, the second user plane network element, for the terminal may serve as the network-side multicast source and sends the multicast packet received from the terminal to the other terminal in the multicast group. Therefore, the multicast group is created for the terminal serving as a multicast source.

Further, in an implementation, a multicast group address or a multicast group identifier may be used in this application to identify a multicast group.

For example, before sending the first request message to the first control plane network element, the terminal may obtain a multicast group address of a multicast group that needs to be created. In this case, the first request message in step 601 may carry the multicast group address. Correspondingly, the first control plane network element may obtain the multicast group address from the first request message, and send the second request message including the multicast group address to the second control plane network element in step 602. Further, the first control plane network element may include the multicast group address in the first indication information in step 605, such that the second user plane network element may obtain the multicast group address.

For still another example, before sending the first request message to the first control plane network element, the terminal cannot obtain a multicast group address of a multicast group that needs to be created. In this case, the first request message in step 601 does not carry the multicast group address. In this case, in an implementation, the first control plane network element may allocate the multicast group address, and send the second request message including the allocated multicast group address to the second control plane network element in step 602. Further, the first control plane network element may include the multicast group address in the first indication information in step 605, such that the second user plane network element may obtain the multicast group address. In addition, the first control plane network element may further send the multicast group address to the terminal in the following step 606.

Step 606: The first control plane network element sends the multicast group address to the terminal, and correspondingly, the terminal receives the multicast group address.

Step 606 is optional. In addition, there is no strict execution sequence between steps 606 and 605.

It should be noted that if steps 602 to 604 are not performed, the first control plane network element does not send the multicast group address to the second control plane network element.

For still another example, before sending the first request message to the first control plane network element, the terminal cannot obtain a multicast group address of a multicast group that needs to be created. In this case, the first request message in step 601 does not carry the multicast group address. In this case, in another implementation, the second control plane network element may allocate the multicast group address, and send the allocated multicast group address to the first control plane network element in step 604, or send the allocated multicast group address to the first control plane network element in a separate step. Further, the first control plane network element may include the multicast group address in the first indication information in step 605, such that the second user plane network element may obtain the multicast group address. In addition, the first control plane network element may further send the multicast group address to the terminal in the foregoing step 606.

It should be noted that if steps 602 to 604 are not performed, the foregoing method is used to obtain the multicast group address.

Further, when the multicast group address is allocated by the first control plane network element or the second control plane network element, the first request message does not carry the multicast group address. In this case, in an implementation, the terminal may send the first request message including the multicast group identifier to the first control plane network element. Subsequently, after the first control plane network element allocates the multicast group address or the first control plane network element receives the multicast group address from the second control plane network element, the first control plane network element may further determine a correspondence between the multicast group identifier and the multicast group address. Then, the first control plane network element sends the correspondence to a network function network element for storage. In this way, the corresponding multicast group address can be subsequently obtained from the network function network element through query based on the multicast group identifier. For example, based on the application scenario shown in FIG. 3, the SMF 1 may establish the correspondence between the multicast group identifier and the multicast group address, and then send the correspondence to the NF for storage. For another example, based on the application scenario shown in FIG. 4, the SMF 1 may establish the correspondence between the multicast group identifier and the multicast group address and then send the correspondence to the NF 2 for storage.

The multicast group identifier and the multicast group address may be collectively referred to as identification information of the multicast group. In other words, the identification information of the multicast group includes the multicast group identifier and/or the multicast group address. Certainly, the identification information of the multicast group may further include other identification information. Further, the identification information of the multicast group may be one type of information about the multicast group. In other words, the information about the multicast group includes the identification information of the multicast group.

Optionally, in an implementation, after the second control plane network element selects the second user plane network element as the multicast source, the following steps 607 and 608 may be further included.

Step 607: The second control plane network element sends address information of the second user plane network element to the first control plane network element, and correspondingly, the first control plane network element receives the address information of the second user plane network element.

Certainly, if steps 602 to 604 are not performed, step 607 is not performed either. As an alternative to step 607, the first control plane network element may determine the address information of the second user plane network element.

Step 608: The first control plane network element determines a correspondence between the address information of the second user plane network element and the multicast group address, and sends the correspondence to the network function network element.

According to the method, the corresponding address information of the second user plane network element may be subsequently obtained from the network function network element through query based on the multicast group address. For example, based on the application scenario shown in FIG. 3, the SMF 1 may establish the correspondence between the address information of the second user plane network element and the multicast group address, and then send the correspondence to the NF for storage. For another example, based on the application scenario shown in FIG. 4, the SMF 1 may establish the correspondence between the address information of the second user plane network element and the multicast group address, and then send the correspondence to the NF 2 for storage.

A function of the address information of the second user plane network element (namely, the multicast source) is as follows: After the multicast group is created, the terminal sends the multicast packet to the second user plane network element, where the multicast packet includes a source address and a destination address, and the source address is an address of the terminal. After receiving the multicast packet, the second user plane network element may replace the source address in the multicast packet with the address information of the second user plane network element, and then send the multicast packet to another terminal. In this way, the source address of the terminal serving as the user multicast source may be invisible, and the other terminal that receives the multicast packet considers that the second user plane network element is the multicast source.

It should be noted that steps 607 and 608 may be performed in any step after step 603. Alternatively, steps 607 and 604 may be combined into one step for execution.

Further, in an implementation, the following steps 609 and 610 may be included.

Step 609: The first control plane network element sends the address information of the second user plane network element to the second user plane network element, and correspondingly, the second user plane network element receives the address information of the second user plane network element.

Step 610: The first control plane network element sends third indication information to the second user plane network element, and correspondingly, the second user plane network element receives the third indication information.

The third indication information is used to indicate the third user plane network element to use the address information of the second user plane network element as the source address of the multicast packet when sending the multicast packet identified by a multicast address.

It should be noted that steps 609 and 610 may also be combined into one step for execution. Further, steps 609 and 610 may be performed in any step after step 603.

Optionally, the following step 611 may be further included.

Step 611: The first control plane network element sends a response message to the terminal, and correspondingly, the terminal receives the response message.

If step 611 is performed, in an implementation, steps 611 and 606 may be separately performed and step 611 may be performed in any step after step 604. In another implementation, steps 611 and 606 may be combined into one step for execution. In this case, the response message in step 611 includes the multicast group address and step 611 may still be performed in any step after step 604.

According to the foregoing method steps, the terminal initiates a request for creating the multicast group, and then the second control plane network element selects the second user plane network element as the multicast source, or the first control plane network element determines the second user plane network element as the multicast source. The terminal may send the multicast packet to the second user plane network element, and the second user plane network element serves as the multicast source and sends the multicast packet to another terminal in the multicast group. Therefore, the multicast group is created.

With reference to an embodiment, the following describes the multicast group creation methods shown in FIG. 5 and FIG. 6.

Figure 7:
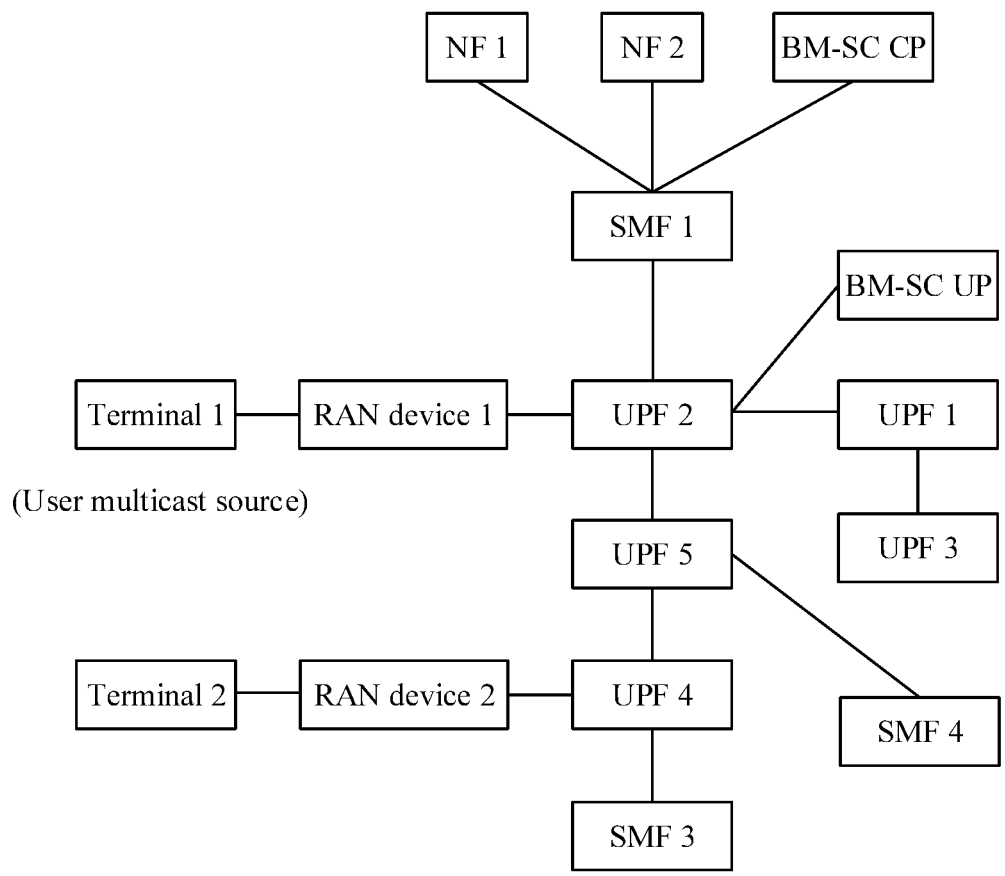
FIG. 7 is an example diagram of an application scenario according to this application.

FIG. 7 is an example diagram of an application scenario according to this application. A terminal 1 serves as a user multicast source and initiates a request for creating a multicast group. An SMF 1 is the first control plane network element in the foregoing embodiments, a UPF 2 is the second user plane network element in the foregoing embodiments, and the SMF 1 may manage the UPF 2.

In an example, a BM-SC CP is the second control plane network element in the foregoing embodiments, a BM-SC UP is the first user plane network element in the foregoing embodiments, and the BM-SC UP is also the third user plane network element in the foregoing embodiments.

In another example, an NF 1 is the second control plane network element in the foregoing embodiments, and a UPF 1 is the first user plane network element in the foregoing embodiments. In addition, when the UPF 1 is a multicast source, the UPF 1 may also be referred to as a third user plane network element.

The following separately describes the foregoing different examples.

Example 1: A first control plane network element is the SMF 1, a second user plane network element is the UPF 2, a second control plane network element is the BM-SC CP, and a first user plane network element is the BM-SC UP.

In this example, when the terminal 1 needs to create the multicast group, the terminal 1 sends a first request message to the SMF 1, the SMF 1 sends a second request message to the BM-SC CP, and the BM-SC CP selects the BM-SC UP as a network-side multicast source of the terminal 1. Further, the BM-SC CP sends information about the BM-SC UP to the SMF 1, and the SMF 1 sends indication information to the UPF 2, to indicate the UPF 2 to send a multicast packet received from the terminal to the BM-SC UP. For example, the SMF 1 may send the information about the BM-SC UP to the UPF 2, and the UPF 2 may send the multicast packet to the BM-SC UP after receiving the multicast packet. Subsequently, the BM-SC UP sends the multicast packet to another terminal in the multicast group.

Example 2: A first control plane network element is the SMF 1, a second user plane network element is the UPF 2, a second control plane network element is the NF 1, a first user plane network element is the UPF 1, and a third user plane network element is the UPF 1. In other words, the multicast source is the UPF 1.

In this example, when the terminal 1 needs to create the multicast group, the terminal 1 sends a first request message to the SMF 1, the SMF 1 sends a second request message to the NF 1, and the NF 1 selects the UPF 1 as a network-side multicast source of the terminal 1. Further, the NF 1 sends information about the UPF 1 to the SMF 1, and the SMF 1 sends indication information to the UPF 2, to indicate the UPF 2 to send a multicast packet received from the terminal to the UPF 1. For example, the SMF 1 may send the information about the UPF 1 to the UPF 2, and the UPF 2 may send the multicast packet to the UPF 1 after receiving the multicast packet. Subsequently, the UPF 1 sends the multicast packet to another terminal in the multicast group.

Example 3: A first control plane network element is the SMF 1, a second user plane network element is the UPF 2, a second control plane network element is the NF 1, a first user plane network element is the UPF 1, and a third user plane network element is the UPF 3. In other words, the multicast source is the UPF 3.

In this example, when the terminal 1 needs to create the multicast group, the terminal 1 sends a first request message to the SMF 1, the SMF 1 sends a second request message to the NF 1, and the NF 1 selects the UPF 3 as a network-side multicast source of the terminal 1. Further, the NF 1 sends information about the UPF 1 to the SMF 1, and the SMF 1 sends indication information to the UPF 2, to indicate the UPF 2 to send a multicast packet received from the terminal to the UPF 1. For example, the SMF 1 may send the information about the UPF 1 to the UPF 2, and the UPF 2 may send the multicast packet to the UPF 1 after receiving the multicast packet. After receiving the multicast packet, the UPF 1 may send the multicast packet to the multicast source UPF 3. Subsequently, the UPF 3 sends the multicast packet to another terminal in the multicast group.

Example 4: A first control plane network element is the SMF 1, a second user plane network element is the UPF 2, and a second control plane network element is the NF 1, where the second user plane network element is the multicast source.

In this example, when the terminal 1 needs to create the multicast group, the terminal 1 sends a first request message to the SMF 1, the SMF 1 sends a second request message to the NF 1, and the NF 1 selects the UPF 2 as a network-side multicast source of the terminal 1. Further, the NF 1 sends second indication information to the SMF 1 to indicate that the UPF 2 is to serve as the multicast source. Then, the SMF 1 sends first indication information to the UPF 2 to indicate the UPF 2 to receive a multicast packet sent by the terminal. After receiving the multicast packet, the UPF 2 may send the multicast packet to another terminal in the multicast group.

Alternatively, the SMF 1 does not send the second request message to the NF 1, but directly determines, based on a preset method, the UPF 2 as the multicast source, and then sends the first indication information to the UPF 2.

The following describes a multicast group joining method. The method may be combined with the multicast group creation method described in the foregoing embodiments. Alternatively, the multicast group joining method may be combined with another multicast group creation method. This is not limited in this application.

Description is provided below using an example in which a user plane network element that serves a terminal and that requests to join a multicast group is a fourth user plane network element, and a control plane network element is a third control plane network element.

Figure 8A:
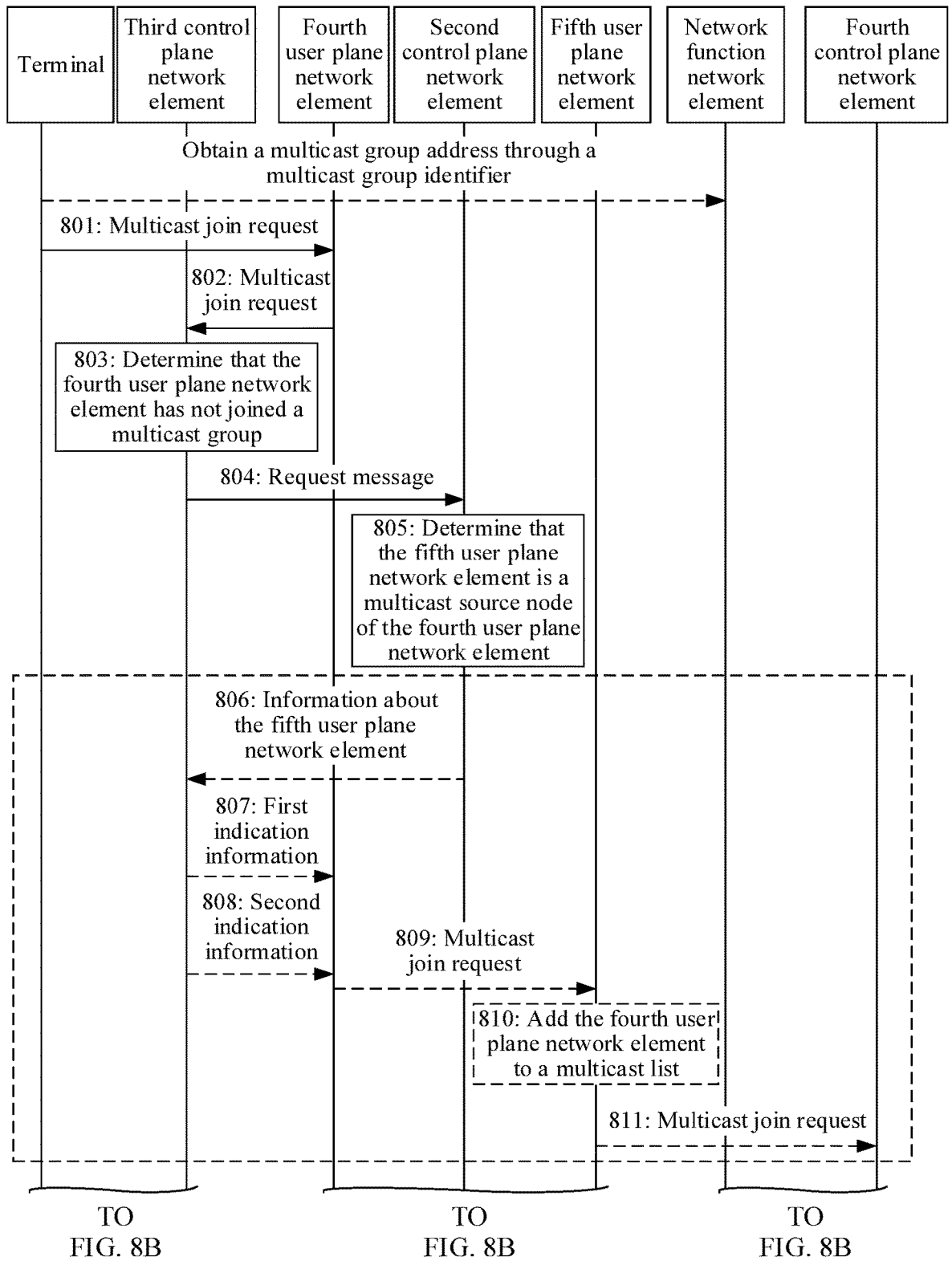
FIG. 8A and FIG. 8B are flowcharts of a multicast group joining method according to an embodiment of this application.
Figure 8B:
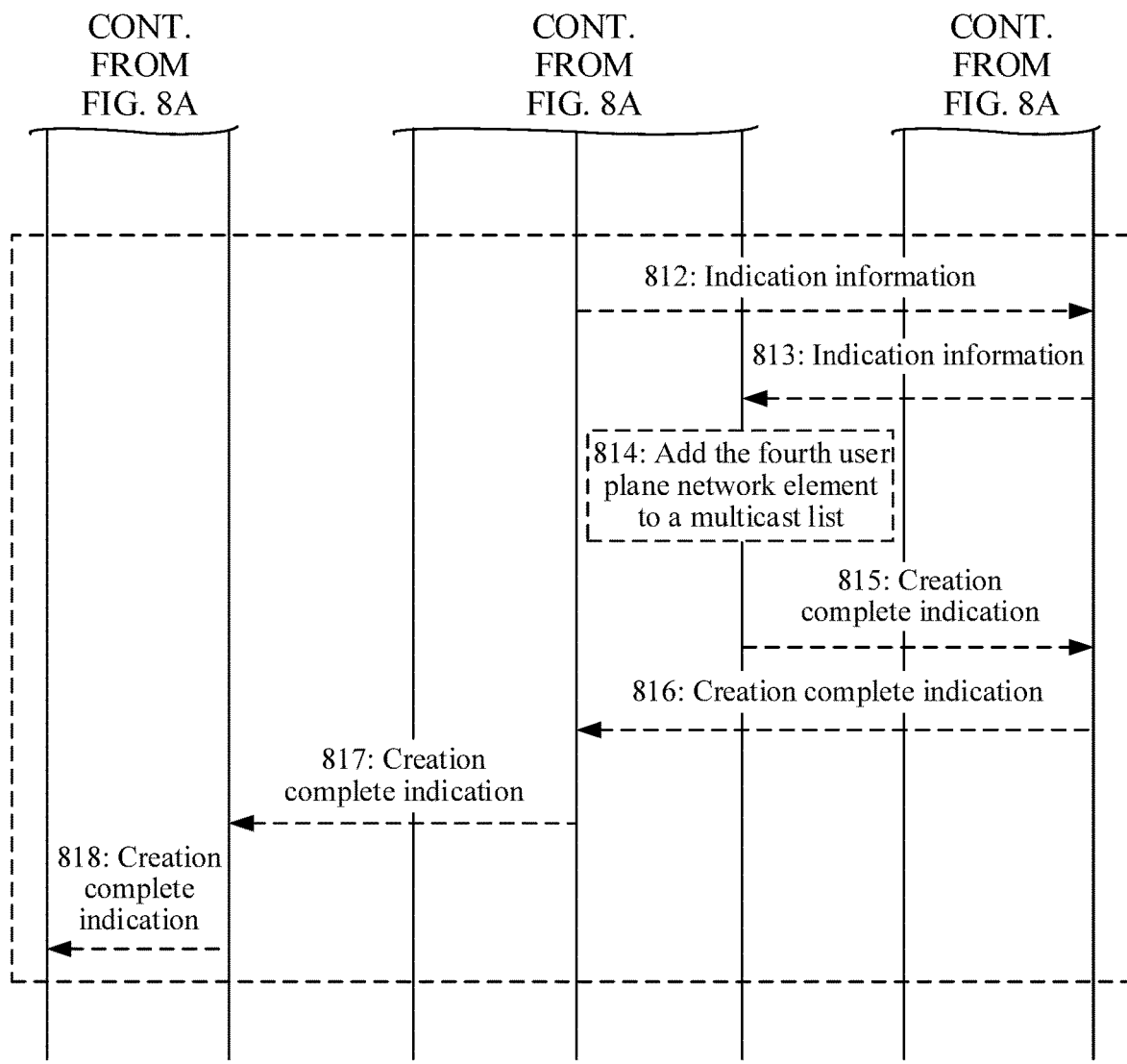

FIG. 8A and FIG. 8B are a schematic diagram of a multicast group joining method according to an embodiment of this application. The method includes the following steps.

Step 801: The terminal sends a multicast group join request to the fourth user plane network element, and correspondingly, the fourth user plane network element receives the multicast group join request.

For example, the multicast group join request may be a multicast join packet, and the multicast join packet carries information about the multicast group. For example, the information about the multicast group may include identification information of the multicast group, and the identification information of the multicast group may be a multicast group address. A multicast group identified by the multicast group address is the multicast group that the terminal requests to join.

In an implementation, the terminal may obtain the multicast group address during subscription.

In another implementation, the terminal may obtain a multicast group identifier during subscription. Then, when requesting to join the multicast group, the terminal may obtain, from a network function network element through the multicast group identifier, a multicast group address corresponding to the multicast group identifier.

Step 802: The fourth user plane network element sends a multicast group join request to the third control plane network element, and correspondingly, the third control plane network element receives the multicast group join request.

The multicast group join request carries the information about the multicast group.

In an alternative implementation, the following steps 801' and 802' may be used to replace the foregoing steps 801 and 802. Alternatively, the following step 801' may be used to replace the foregoing steps 801 and 802.

Step 801': The terminal sends a request message to the third control plane network element, and correspondingly, the third control plane network element receives the request message.

The request message may be a non-access stratum (NAS) message, and is used to request to join a multicast group corresponding to a multicast group identifier.

The request message includes a session identifier and the multicast group identifier. Alternatively, the request message includes a session identifier and a multicast group address.

Step 802': The third control plane network element obtains, from a network function network element, the multicast group address corresponding to the multicast group identifier.

This step is optional. When the request message in step 801' carries the multicast group identifier, step 802' is performed.

Step 803: The third control plane network element determines that the fourth user plane network element has not joined the multicast group.

After receiving the multicast group join request, the third control plane network element first determines whether the fourth user plane network element has joined the multicast group identified by the information about the multicast group. In an implementation, if the third control plane network element determines that the terminal served by the fourth user plane network element has not joined the multicast group and that a terminal served by another user plane network element connected to the fourth user plane network element has not joined the multicast group either, the third control plane network element determines that the fourth user plane network element has not joined the multicast group.

If the third control plane network element determines that the fourth user plane network element has not joined the multicast group, subsequent steps continue to be performed. If it is determined that the fourth user plane network element has joined the multicast group, it indicates that the fourth user plane network element can receive a multicast packet of the multicast group. Therefore, the fourth user plane network element does not need to be added to the multicast group, and the terminal only needs to receive the multicast packet from the fourth user plane network element.

Step 804: The third control plane network element sends a request message to a second control plane network element, and correspondingly, the second control plane network element receives the request message.

The request message includes information about the fourth user plane network element and the information about the multicast group, and the request message is used to request to add the fourth user plane network element to the multicast group.

The second control plane network element herein may be the NF 1 or the BM-SC CP in the foregoing embodiments.

Step 805: The second control plane network element determines that a fifth user plane network element is a multicast source node of the fourth user plane network element.

The multicast source node is a previous-hop user plane network element of the fourth user plane node on a multicast path, and the multicast path is a path that is from a multicast source to the fourth user plane network element and that is used for sending the multicast packet.

According to the foregoing method, the multicast source node may be selected for the fourth user plane network element, and the fourth user plane network element may subsequently receive the multicast packet from the fifth user plane network element.

After step 805, there are two methods for creating a path from the fifth user plane network element to the fourth user plane network element, and separate descriptions are provided below.

Method 1 includes the following steps 806 to 811.

Step 806: The second control plane network element sends information about the fifth user plane network element to the third control plane network element, and correspondingly, the third control plane network element receives the information about the fifth user plane network element.

Step 807: The third control plane network element sends first indication information to the fourth user plane network element, and correspondingly, the fourth user plane network element receives the first indication information.

The first indication information is used to indicate the fourth user plane network element to send the received multicast packet to the terminal.

Step 808: The third control plane network element sends second indication information to the fourth user plane network element, and correspondingly, the fourth user plane network element receives the second indication information.

The second indication information is used to indicate the fourth user plane network element to send a multicast join packet to the fifth user plane network element.

It should be noted that steps 807 and 808 may be separately performed or may be combined into one step for execution.

Step 809: The fourth user plane network element sends a multicast join packet to the fifth user plane network element, and correspondingly, the fifth user plane network element receives the multicast join packet.

The multicast join packet is used for requesting to join the multicast group. The multicast join packet carries information about the multicast group, and the information about the multicast group is used to identify a multicast group requested to be joined.

Step 810: The fifth user plane network element adds the fourth user plane network element to a multicast list.

Subsequently, when receiving the multicast packet, the fifth user plane network element may send the multicast packet to the fourth user plane network element.

Step 811: The fifth user plane network element sends a multicast join packet to a fourth control plane network element, and correspondingly, the fourth control plane network element receives the multicast join packet.

This step is optional. The fourth control plane network element is a control plane network element of the fifth user plane network element.

In still another implementation, after step 805, the following method may be performed.

Method 2 includes the following steps 812 to 817.

Step 812: The second control plane network element sends indication information to a fourth control plane network element, and correspondingly, the fourth control plane network element receives the indication information.

The indication information includes the information about the multicast group, the information about the fourth user plane network element, and information about the fifth user plane network element. The indication information is used to indicate to add the fourth user plane network element to the multicast group to which the fifth user plane network element belongs.

Step 813: The fourth control plane network element sends indication information to the fifth user plane network element, and correspondingly, the fifth user plane network element receives the indication information.

The indication information includes the information about the fourth user plane network element and the information about the multicast group. The indication information is used to indicate to add the fourth user plane network element to the multicast group to which the fifth user plane network element belongs.

Step 814: The fifth user plane network element adds the fourth user plane network element to a multicast list.

Subsequently, when receiving the multicast packet, the fifth user plane network element may send the multicast packet to the fourth user plane network element.

Step 815: The fifth user plane network element sends a creation complete indication to the fourth control plane network element, and correspondingly, the fourth control plane network element receives the creation complete indication.

Step 816: The fourth control plane network element sends the creation complete indication to the second control plane network element, and correspondingly, the second control plane network element receives the creation complete indication.

Step 817: The second control plane network element sends the creation complete indication to the third control plane network element, and correspondingly, the third control plane network element receives the creation complete indication.

Step 818: The third control plane network element sends the creation complete indication to the terminal, and correspondingly, the terminal receives the creation complete indication.

Optionally, if step 801' is performed and the request message carries the multicast group identifier, the third control plane network element may further send the multicast group address to the terminal in step 818.

Steps 815 and 818 are optional.

In still another implementation, if indications in steps 815 to 817 are creation failure indications, an indication in step 818 is also replaced by the creation failure indication. Optionally, when sending the creation failure indication to the terminal, the third control plane network element may further send a failure cause to the terminal. For example, the failure cause may be that the multicast group does not exist.

In the foregoing embodiment, the terminal may be added to the created multicast group, and the terminal may subsequently receive the multicast packet of the multicast group. To be more specific, the multicast source may send the multicast packet to the fifth user plane network element, the fifth user plane network element sends the multicast packet to the fourth user plane network element, and then the fourth user plane network element sends the multicast packet to the terminal. Therefore, a procedure in which the terminal joins the multicast group is completed.

For example, referring to FIG. 7, if a terminal that needs to join the multicast group is a terminal 2, a user plane network element serving the terminal 2 is a UPF 4 (namely, the fourth user plane network element), a control plane network element serving the terminal 2 is an SMF 3 (namely, the third control plane network element), and a multicast source node selected by the second control plane network element (the NF 1 or BM-SC CP) for the UPF 4 is a UPF 5 (namely, the fifth user plane network element).

For example, if the multicast source is the UPF 1, a multicast packet sent by the terminal 1 serving as the user multicast source may reach the terminal 2 along the following path: the terminal 1→the UPF 2→the UPF 1 (the multicast source)→the UPF 2→the UPF 5→the UPF 4→the terminal 2.

For another example, if the multicast source is the BM-SC UP, a multicast packet sent by the terminal 1 serving as the user multicast source may reach the terminal 2 along the following path: the terminal 1→the UPF 2→the BM-SC UP (the multicast source)→the UPF 2→the UPF 5→the UPF 4→the terminal 2.

For still another example, if the multicast source is the UPF 3, a multicast packet sent by the terminal 1 serving as the user multicast source may reach the terminal 2 along the following path: the terminal 1→the UPF 2→the UPF 1→the UPF 3 (the multicast source)→the UPF 1→the UPF 2→the UPF 5→the UPF 4→the terminal 2.

For yet another example, if the multicast source is the UPF 2, a multicast packet sent by the terminal 1 serving as the user multicast source may reach the terminal 2 along the following path: the terminal 1→the UPF 2 (the multicast source)→the UPF 5→the UPF 4→the terminal 2.

Figure 9:
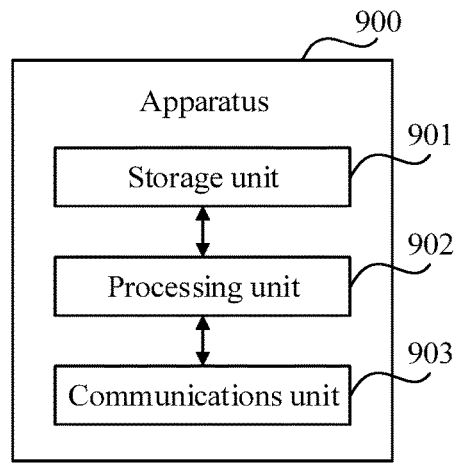
FIG. 9 is a schematic diagram of an apparatus according to this application.

When an integrated unit is used, FIG. 9 is a possible example block diagram of an apparatus related to an embodiment of this application. An apparatus 900 may exist in a form of software, or may be a terminal, or may be a chip in a terminal. The apparatus 900 includes a processing unit 902 and a communications unit 903. The processing unit 902 is configured to control and manage an action of the apparatus 900. The communications unit 903 is configured to support the apparatus 900 in communicating with another network entity (for example, a first control plane network element, a second user plane network element, a third control plane network element, or a fourth user plane network element). For example, the communications unit 903 is configured to support the apparatus 900 in performing steps 501, 506, and 511 in FIG. 5, steps 601, 606, and 611 in FIG. 6, and step 801 in FIG. 8A and FIG. 8B. The apparatus 900 may further include a storage unit 901, configured to store program code and data of the apparatus 900.

For example, the communications unit 903 is configured to send a request message to the first control plane network element, where the request message is used to request to create a multicast group; and receive a response message from the first control plane network element, where the response message is used to indicate completion of creating the multicast group.

In a possible implementation, the request message includes information about the multicast group, and the information about the multicast group includes identification information of the multicast group.

In another possible implementation, the identification information of the multicast group includes a multicast group identifier or a multicast group address.

In still another possible implementation, the response message includes the multicast group address.

The processing unit 902 may be a processor or a controller, for example, may be a general purpose central processor (CPU), a general purpose processor, a digital signal processor (DSP), an application-specific integrated circuit (ASIC), a field-programmable gate array (FPGA), or another programmable logic device, a transistor logic device, a hardware component, or any combination thereof. The processing unit 902 may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. The communications unit 903 may be a communications interface, a transceiver, a transceiver circuit, or the like. The storage unit 901 may be a memory.

Figure 10:
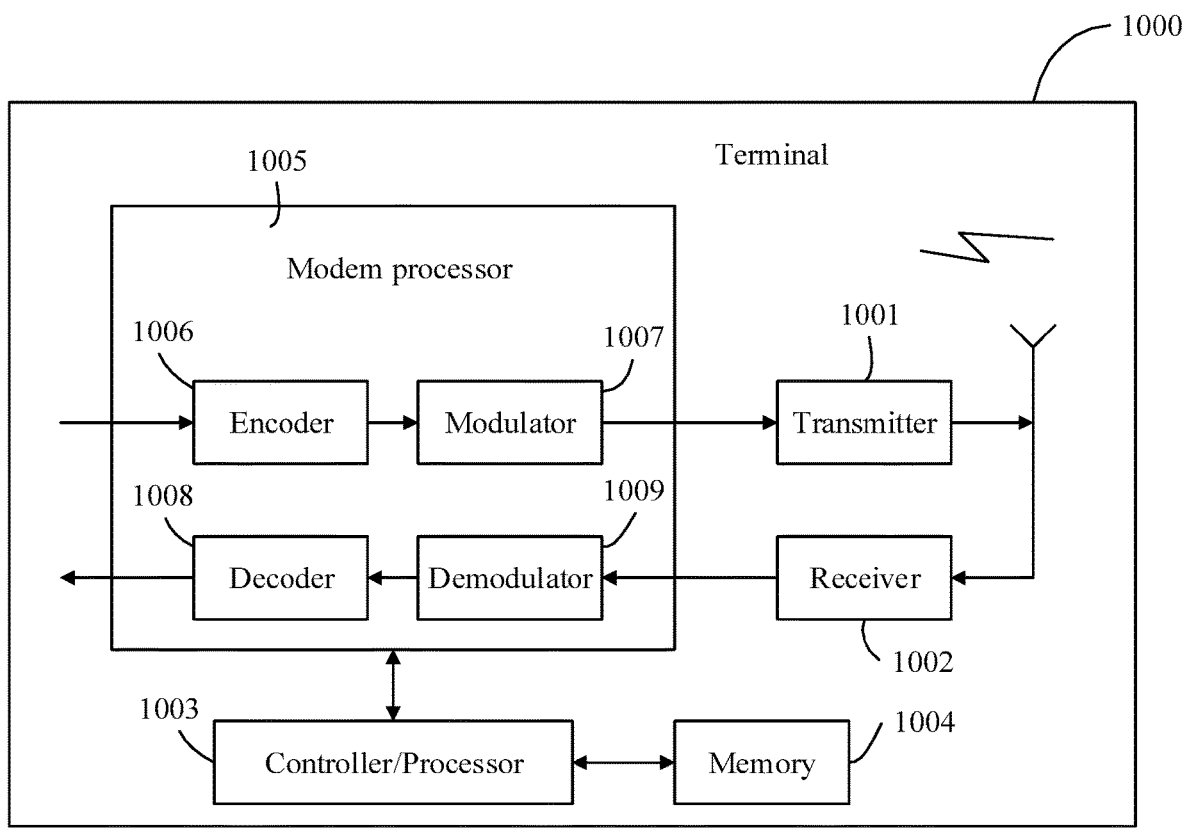
FIG. 10 is a schematic diagram of a terminal according to this application.

When the processing unit 902 is a processor, the communications unit 903 is a transceiver, and the storage unit 901 is a memory, the apparatus 900 related to this embodiment of this application may be a terminal shown in FIG. 10.

FIG. 10 is a simplified schematic diagram of a possible design structure of a terminal according to an embodiment of this application. A terminal 1000 includes a transmitter 1001, a receiver 1002, and a processor 1003. The processor 1003 may alternatively be a controller, and is represented as a "controller/processor 1003" in FIG. 10. Optionally, the terminal 1000 may further include a modem processor 1005. The modem processor 1005 may include an encoder 1006, a modulator 1007, a decoder 1008, and a demodulator 1009.

In an example, the transmitter 1001 adjusts (for example, through analog conversion, filtering, amplification, and up-conversion) an output sample and generates an uplink signal. The uplink signal is transmitted to the RAN device in the foregoing embodiments through an antenna. On a downlink, the antenna receives a downlink signal transmitted by the RAN device in the foregoing embodiments. The receiver 1002 adjusts (for example, through filtering, amplification, down-conversion, and digitization) a signal received from the antenna and provides an input sample. In the modem processor 1005, the encoder 1006 receives service data and a signaling message that are to be sent over an uplink, and processes (for example, formats, encodes, and interleaves) the service data and the signaling message. The modulator 1007 further processes (for example, performs symbol mapping and modulation) encoded service data and an encoded signaling message and provides an output sample. The demodulator 1009 processes (for example, demodulates) the input sample and provides symbol estimation. The decoder 1008 processes (for example, de-interleaves and decodes) the symbol estimation and provides decoded data and a decoded signaling message that are to be sent to the terminal 1000. The encoder 1006, the modulator 1007, the demodulator 1009, and the decoder 1008 may be implemented by the combined modem processor 1005. These units perform processing based on a radio access technology (for example, an access technology of an LTE or another evolution system) used by a RAN. It should be noted that when the terminal 1000 does not include the modem processor 1005, the foregoing functions of the modem processor 1005 may alternatively be performed by the processor 1003.

The processor 1003 controls and manages actions of the terminal 1000 and is configured to perform processing procedures performed by the terminal 1000 in the foregoing embodiments of this application. For example, the processor 1003 is further configured to perform a processing procedure related to the terminal in the methods shown in FIG. 5, FIG. 6, and FIG. 8A and FIG. 8B and/or another process of the technical solutions described in this application.

Further, the terminal 1000 may include a memory 1004, where the memory 1004 is configured to store program code and data of the terminal 1000.

Figure 11:
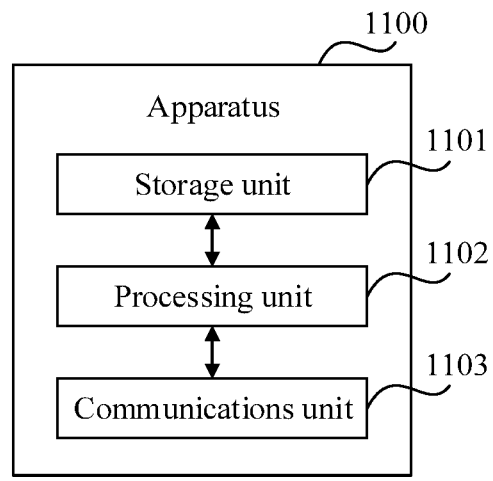
FIG. 11 is a schematic diagram of an apparatus according to this application.

When an integrated unit is used, FIG. 11 is a possible example block diagram of an apparatus related to an embodiment of this application. An apparatus 1100 may exist in a form of software, or may be a control plane network element, or may be a chip in a control plane network element. The apparatus 1100 includes a processing unit 1102 and a communications unit 1103. The processing unit 1102 is configured to control and manage an action of the apparatus 1100. The communications unit 1103 is configured to support the apparatus 1100 in communicating with another network entity (for example, a RAN device, a terminal, or another control plane network element). The apparatus 1100 may further include a storage unit 1101, configured to store program code and data of the apparatus 1100.

The processing unit 1102 may be a processor or a controller, for example, may be a CPU, a general purpose processor, a DSP, an ASIC, an FPGA, or another programmable logic device, a transistor logic device, a hardware component, or any combination thereof. The processing unit 1102 may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. The communications unit 1103 may be a communications interface, a transceiver, a transceiver circuit, or the like. The communications interface is a general term. In implementation, the communications interface may include a plurality of interfaces, for example, may include an interface between the control plane network element and the RAN device, an interface between the control plane network element and another control plane network element, and/or another interface. The storage unit 1101 may be a memory.

The apparatus 1100 shown in FIG. 11 may be a first control plane network element in this application, or may be a second control plane network element in this application, or may be a third control plane network element in this application.

When the apparatus 1100 is the first control plane network element, the processing unit 1102 may support the apparatus 1100 in performing actions of the first control plane network element in the foregoing method examples. The communications unit 1103 may support the apparatus 1100 in communicating with another control plane network element or a user plane network element. For example, the communications unit 1103 is configured to support the apparatus 1100 in performing steps 501, 502, 504 to 508, and 511 in FIG. 5, and steps 601, 602, 604 to 608, and 611 in FIG. 6.

To be more specific, when the apparatus 1100 is the first control plane network element, in an implementation, the processing unit 1102 is configured to control the communications unit 1103 to perform the following operations: receiving a first request message from the terminal, where the first request message is used to request to create a multicast group; sending a second request message to a second control plane network element, where the second request message is used to request to create the multicast group; receiving information about a first user plane network element from the second control plane network element; and sending indication information to a second user plane network element, where the indication information is used to indicate the second user plane network element to send a multicast packet received from the terminal to the first user plane network element.

In another implementation, the processing unit 1102 is configured to control the communications unit 1103 to perform the following operations: receiving a first request message from the terminal, where the first request message is used to request to create a multicast group; and sending first indication information to a second user plane network element, where the first indication information is used to indicate the second user plane network element to receive a multicast packet sent by the terminal.

When the apparatus 1100 is the second control plane network element, the processing unit 1102 may support the apparatus 1100 in performing actions of the second control plane network element in the foregoing method examples. For example, the processing unit 1102 is configured to support the apparatus 1100 in performing step 503 in FIG. 5, step 603 in FIG. 6, step 805 in FIG. 8A and FIG. 8B, and/or another process of the technology described in this specification. The communications unit 1103 may support the apparatus 1100 in communicating with another control plane network element or a user plane network element. For example, the communications unit 1103 is configured to support the apparatus 1100 in performing steps 502, 504, 507, 509, and 510 in FIG. 5, steps 602, 604, and 607 in FIG. 6, and steps 804, 806, 812, 816, and 817 in FIG. 8A and FIG. 8B.

To be more specific, when the apparatus 1100 is the third control plane network element, in an implementation, the communications unit 1103 is configured to receive a request message from the third control plane network element, where the request message includes information about a fourth user plane network element and information about a multicast group, and the request message is used to request to add the fourth user plane network element to the multicast group; and the processing unit 1102 is configured to determine that a fifth user plane network element is a multicast source node of the fourth user plane network element.

Optionally, the communications unit 1103 is further configured to: receive a request message from a first control plane network element, where the request message is used to request to create the multicast group; and send information about a first user plane network element to the first control plane network element.

Optionally, the information about the first user plane network element includes at least one of an identifier of the first user plane network element, an address of the first user plane network element, or a tunnel identifier.

Optionally, the processing unit 1102 is further configured to select a third user plane network element as a multicast source.

Optionally, the communications unit 1103 is further configured to send address information of the third user plane network element to the first control plane network element, where the address information is used as a multicast source address when the third user plane network element serves as the multicast source of the multicast group.

Optionally, the communications unit 1103 is further configured to send indication information to the third user plane network element, where the indication information is used to indicate the third user plane network element to use the address information of the third user plane network element as a source address of the multicast packet when sending the multicast packet identified by a multicast address.

Optionally, the communications unit 1103 is further configured to send the address information of the third user plane network element to the third user plane network element.

In still another implementation, the communications unit 1103 is further configured to: receive a request message from the first control plane network element, where the request message is used to request to create a multicast group; and send indication information to the first control plane network element, where the indication information is used to indicate to use a second user plane network element as a multicast source.

When the apparatus 1100 is the third control plane network element, the processing unit 1102 may support the apparatus 1100 in performing actions of the third control plane network element in the foregoing method examples. For example, the processing unit 1102 is configured to support the apparatus 1100 in performing step 803 in FIG. 8A and FIG. 8B and/or another process of the technology described in this specification. The communications unit 1103 may support the apparatus 1100 in communicating with another control plane network element or a user plane network element. For example, the communications unit 1103 is configured to support the apparatus 1100 in performing steps 802, 804, 806 to 808, 817, and 818 in FIG. 8A and FIG. 8B.

To be more specific, when the apparatus 1100 is the third control plane network element, the communications unit 1103 is configured to receive a multicast group join request from a fourth user plane network element, where the multicast group join request includes information about a multicast group; the processing unit 1102 is configured to determine that the fourth user plane network element has not joined the multicast group; and the communications unit 1103 is further configured to send a request message to a second control plane network element, where the request message includes information about the fourth user plane network element and the information about the multicast group, and the request message is used to request to add the fourth user plane network element to the multicast group.

Figure 12:
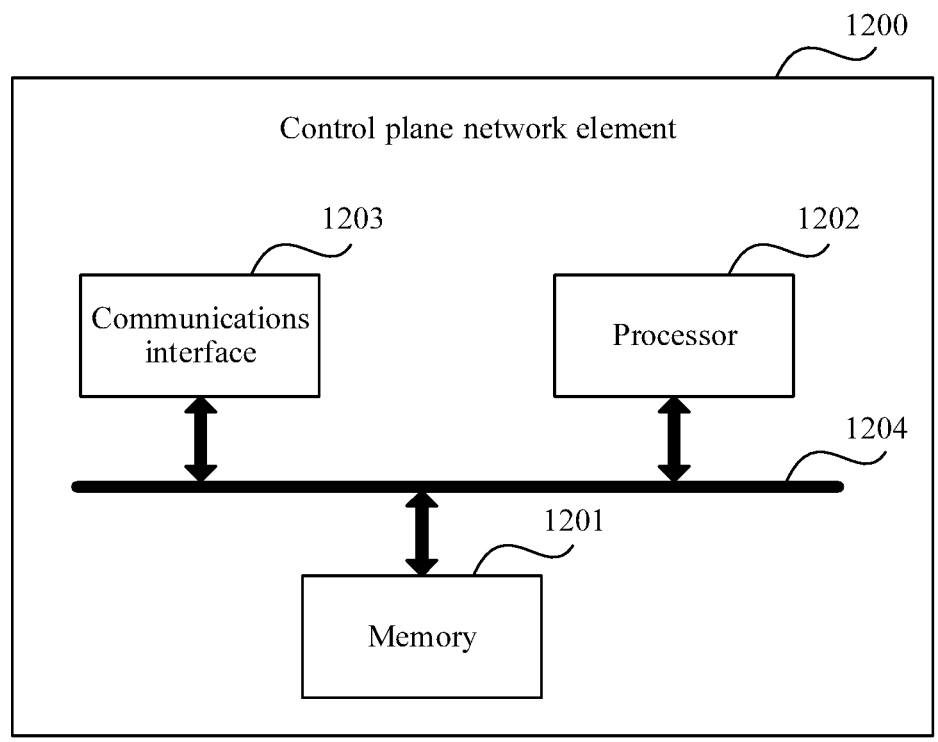
FIG. 12 is a schematic diagram of a control plane network element according to this application.

When the processing unit 1102 is a processor, the communications unit 1103 is a communications interface, and the storage unit 1101 is a memory, the apparatus 1100 related to this embodiment of this application may be a control plane network element 1200 shown in FIG. 12.

Referring to FIG. 12, the control plane network element 1200 includes a processor 1202, a communications interface 1203, and a memory 1201. Optionally, the control plane network element 1200 may further include a bus 1204. The communications interface 1203, the processor 1202, and the memory 1201 may be connected to each other by a communications line 1204. The communication line 1204 may be a peripheral component interconnect (PCI) bus, an extended industry standard architecture (EISA) bus, or the like. The communications line 1204 may be classified into an address bus, a data bus, a control bus, and the like. For ease of representation, only one thick line is used to represent the bus in FIG. 12, but this does not mean that there is only one bus or only one type of bus.

The processor 1202 may be a general-purpose central processing unit (CPU), a microprocessor, an application-specific integrated circuit (ASIC), or one or more integrated circuits configured to control program execution in the solutions of this application.

The communications interface 1203 may be any apparatus like a transceiver, and is configured to communicate with another device or a communications network, such as Ethernet, a RAN, a wireless local area network (WLAN), or a wired access network.

The memory 1201 may be a read-only memory (ROM) or another type of static storage device capable of storing static information and an instruction, or a random-access memory (RAM) or another type of dynamic storage device capable of storing information and an instruction; or may be an electrically erasable programmable ROM (EEPROM), a compact disc ROM (CD-ROM) or another compact disc storage, an optical disc storage (including a compact disc, a laser disc, an optical disc, a digital versatile disc, a Blue-ray disc, or the like), a magnetic disk storage medium or another magnetic storage device, or any other medium capable of carrying or storing expected program code in a form of an instruction or a data structure and capable of being accessed by a computer. This is not limited. The memory may exist independently, and is connected to the processor by the communications line 1204. The memory may alternatively be integrated with the processor.

The memory 1201 is configured to store a computer-executable instruction for executing the solutions of this application, and the processor 1202 controls execution of the computer-executable instruction. The processor 1202 is configured to execute the computer-executable instruction stored in the memory 1201, to implement a multicast group creation method and a multicast group joining method that are provided in the following embodiments of this application.

Optionally, the computer-executable instruction in this embodiment of this application may also be referred to as application program code. This is not specifically limited in this embodiment of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor such that the processor may read information from the storage medium and write information to the storage medium. Optionally, the storage medium may further be integrated into a processor. The processor and the storage medium may be disposed in an ASIC, and the ASIC may be disposed in a terminal device. Optionally, the processor and the storage medium may also be disposed in different components of a terminal device.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A multicast group creation method implemented by a first control plane network element, wherein the multicast group creation method comprises:
    receiving a first request message from a terminal, wherein the first request message requests creating a multicast group and comprising a multicast group address;
    sending a second request message to a second control plane network element, wherein the second request message requests creating the multicast group and comprising the multicast group address;
    receiving information about a first user plane network element from the second control plane network element;
    sending indication information to a second user plane network element, wherein the indication information instructs the second user plane network element to send a multicast packet received from the terminal to the first user plane network element and comprising the multicast group address;
    receiving address information of a third user plane network element from the second control plane network element, wherein the address information serves as a multicast source address when the third user plane network element serves as a multicast source of the multicast group;
    determining a correspondence between the address information and the multicast group address; and
    sending the correspondence to a network function element.

2. The multicast group creation method of claim 1, wherein the information comprises at least one of identification information of the first user plane network element, address information of the first user plane network element, or a tunnel identifier.

3. The multicast group creation method of claim 1, further comprising allocating the multicast group address.

4. The multicast group creation method of claim 1, further comprising receiving the multicast group address allocated by the second control plane network element.

5. The multicast group creation method of claim 4, further comprising sending the multicast group address to the terminal.

6. The multicast group creation method of claim 1, wherein the first request message comprises a multicast group identifier, and wherein the multicast group creation method further comprises:
    determining, by the first control plane network element, a correspondence between the multicast group identifier and the multicast group address; and
    sending the correspondence to the network function network element.

7. The multicast group creation method of claim 1, wherein the first control plane network element is connected to the second control plane network element.

8. The multicast group creation method of claim 1, wherein the second control plane network element manages the first user plane network element.

9. The multicast group creation method of claim 1, wherein the first user plane network element is connected to the second user plane network element.

10. A multicast group creation method implemented by a first control plane network element, wherein the multicast group creation method comprises:
    receiving a first request message from a terminal, wherein the first request message requests creating a multicast group and comprising a multicast group address;
    sending first indication information to a second user plane network element, wherein the first indication information instructs the second user plane network element to receive a multicast packet from the terminal;
    sending a second request message to a second control plane network element, wherein the second request message requests creating the multicast group and comprising the multicast group address;
    receiving address information of a third user plane network element from the second control plane network element, wherein the address information serves as a multicast source address when the third user plane network element serves as a multicast source of the multicast group;
    determining a correspondence between the address information and the multicast group address; and
    sending the correspondence to a network function element.

11. The multicast group creation method of claim 10, further comprising
    receiving second indication information from the second control plane network element, wherein the second indication information is to notify the first control plane network element that the second user plane network element is to serve as the multicast source.

12. The multicast group creation method of claim 10, wherein the indication information comprises the multicast group address.

13. The multicast group creation method of claim 10, wherein the first request message comprises a multicast group identifier.

14. A first control plane network element, comprising:
a communications unit; and
a processing unit coupled to the communications unit and configured to:
receive a first request message from a terminal, wherein the first request message requests creating a multicast group and comprising a multicast group address;
send a second request message to a second control plane network element, wherein the second request message requests creating the multicast group and comprising the multicast group address;
receive information about a first user plane network element from the second control plane network element;
send indication information to a second user plane network element, wherein the indication information instructs the second user plane network element to send a multicast packet received from the terminal to the first user plane network element;
receive address information of a third user plane network element from the second control plane network element, wherein the address information serves as a multicast source address when the third user plane network element serves as a multicast source of the multicast group;
determine a correspondence between the address information of the third user plane network element and the multicast group address; and
send the correspondence to a network function element.

15. The first control plane network element of claim 14, wherein the information about the first user plane network element comprises at least one of identification information of the first user plane network element, address information of the first user plane network element, or a tunnel identifier.

16. The first control plane network element of claim 14, wherein the indication information comprises the multicast group address.

17. The first control plane network element of claim 14, wherein the processing unit is further configured to allocate the multicast group address, wherein the indication information comprises the multicast group address.

18. The first control plane network element of claim 14, wherein the communications unit is configured to receive a multicast group address allocated by the second control plane network element, and wherein the indication information comprises the multicast group address.

19. The first control plane network element of claim 18, wherein the communications unit is further configured to send the multicast group address to the terminal.

20. The first control plane network element of claim 18, wherein the first request message comprises a multicast group identifier, wherein the processing unit is further configured to determine a correspondence between the multicast group identifier and the multicast group address, and wherein the communications unit is further configured to send the correspondence to the network function element.

* * * * *